US008166528B2

(12) United States Patent  
Inoue et al.

(10) Patent No.: US 8,166,528 B2
(45) Date of Patent: Apr. 24, 2012

(54) WIRELESS COMMUNICATION SYSTEM AND WIRELESS COMMUNICATION METHOD

(75) Inventors: Daisuke Inoue, Tokyo (JP); Masahiro Kuroda, Tokyo (JP); Kentaro Ishizu, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 768 days.

(21) Appl. No.: 12/067,079

(22) PCT Filed: Sep. 15, 2006

(86) PCT No.: PCT/JP2006/318433
§ 371 (c)(1),
(2), (4) Date: Oct. 2, 2008

(87) PCT Pub. No.: WO2007/032499
PCT Pub. Date: Mar. 22, 2007

(65) Prior Publication Data
US 2009/0074187 A1 Mar. 19, 2009

(30) Foreign Application Priority Data
Sep. 16, 2005 (JP) .................. 2005-271144

(51) Int. Cl.
G06F 7/04 (2006.01)
H04W 4/00 (2009.01)
G06F 17/00 (2006.01)
H04K 1/00 (2006.01)

(52) U.S. Cl. ............. 726/6; 370/328; 370/338; 380/270
(58) Field of Classification Search ...... 726/6; 370/328, 370/338
See application file for complete search history.

(56) References Cited

U.S. PATENT DOCUMENTS

2003/0063593 A1* 4/2003 Koyanagi et al. ............. 370/338
2006/0039316 A1* 2/2006 Ogushi ......................... 370/328

FOREIGN PATENT DOCUMENTS

EP 2071883 A2 * 6/2009
JP 2002-268950 9/2002

OTHER PUBLICATIONS

Mao, Y.; Wu, M.; "Tracing Malicious Relays in Cooperative Wireless Communications"; Information Forensics and Security, IEEE Transactions on vol. 2, Issue: 2 Digital Object Identifier: 10.1109/TIFS.2007.897242; Publication Year: Jun. 2007, pp. 198-212.*

(Continued)

Primary Examiner — Matthew Smithers
Assistant Examiner — Courtney Fields
(74) Attorney, Agent, or Firm — Brinks Hofer Gilson & Lione

(57) ABSTRACT

The present invention provides a technology of effectively avoiding tracing on a terminal performed with an identification number being a target and DoS attack without making any significant changes to a communication system.
In the wireless communication system of the present invention, under a control of a control communication processing portion 113 of an access point, a hash function arithmetic operation processing portion 112 generates a third identification number to be updated using a current identification number, hash key and random number for any wireless communication terminal, a control communication processing portion 113 sends an update instruction signal containing the random number to the wireless communication terminal and updates the current identification number stored in the identification number storage portion 121 to a second identification number. When the wireless communication terminal receives an update instruction signal, the current identification number is updated to the second identification number and the hash function arithmetic operation processing portion generates a third identification number using the current identification number, hash key and random number stored in the self number storage portion.

16 Claims, 27 Drawing Sheets

OTHER PUBLICATIONS

3rd Generation Partnership Project, 3G Security; Security Architecture (Release 6), 3GPP TS 33.102, V6.3.0 2004.

LAN MAN Standards Committee of the IEEE Computer Society, "IEE Standards for Local and Metropolitan Area Networks—Port-Based Network Access Control," IEEE Standard 802.1X, 2001.

LAN MAN Standards Committee of the IEEE Computer Society "IEEE 802.11 Wireless LAN Medium Access Control (MAC) and Physical Layer (PHY) Specifications—Amendment 6: Medium Access Control (MAC) Security Enhancements," IEEE Standard 802.11i, 2004.

D. Inoune, et al. "Transient MAC Address Scheme for Untraceability and DoS Attach Resiliency of Wireless Network" Proc. 4th Annual Wireless Telecommunications Symposium, 2005.

Arbaugh et al., "Your 802.11 Wireless Network has no Clothes," IEEE Wireless Communications, vol. 9, pp. 44-51, 2002.

* cited by examiner

WIRELESS COMMUNICATION SYSTEM AND WIRELESS COMMUNICATION METHOD

TECHNICAL FIELD

The present invention relates to a wireless communication system and a wireless communication method and more particularly to technologies on tracing on wireless communication terminal in wireless communication system and protection method against Denial of Service (DoS) attack.

BACKGROUND ART

Recently, the third generation (3G) mobile device communication, wireless LAN based on IEEE802.11 and wireless MAN based on IEEE802.16 have attracted much attention. Such services enable sound and video representation and electronic business transactions under mobile environment.

At the same time, security problems in wireless communication network have been becoming serious. To protect a network from such threats, encryption technology and authentication technology have been demanded and developed.

For example, a security system in standardization project of the third generation mobile device communication system disclosed in a non-patent document 1, a security system based on the IEEE802.1X standard disclosed in a non-patent document 2 and a security system based on 802.11i standard directed to the wireless LAN as disclosed in a non-patent document 3 have been known.

However, although improvements on the encryption technology and the authentication technology as described above have been progressed under the conventional technologies, the protection method against tracing of the wireless communication terminal and Denial of Service attack (Denial of Service attack, hereinafter referred to as DoS) have been left as problems.

The patent document 3 concerns technology which enables registration information of a mobile device to be disclosed to only a reliable client although it is different from the method in the wireless communication system. According to this technology, in order to provide information control system of the registered clients whose privacy is protected, the registration information of the registered clients which are an information controlling object are registered as secrete identifier which changes with a time passage.

The secrete identifier is computed as an identifier as its generation information and as a hash value with respect to a reference time and update time interval and only a reliable client is informed of generation information. A configuration which can disclose registration information of a registered client such as a mobile device to only a specified retrieval client (reliable client) is disclosed.

According to the configuration, generation information of the secrete identifier is data containing at least an identifier corresponding to each device or user, a reference time, a value indicating update time and random number and the secrete identifier is a value calculated by applying a one-way hash function to the generation information.

This technology concerns a geographical position information control system, which makes it difficult to trace a registered client even if retrieval from the identifier of a registered client and inverted retrieval by specifying position information are applied at the same time, even in a configuration which enables the retrieval from the identifier of the registered client and the inverted retrieval by specifying the position information, thereby preventing leakage of the registered client information.

In this way, the conventional technology has provided a technology which makes it difficult to trace by changing the secrete identifier with a time passage.

However, according to this technology, no ordinary wireless communication system can be applied because the secrete identifier needs to be used as well as the identifier. Further, because this is a technology invented against an attack to a terminal, it cannot cope with the DoS attack.

To provide a protection method in the wireless communication system which avoids a trace of the terminal and corresponds to the DoS attack, that method needs to possess a positive countermeasure against the DoS attack while the secrete identifier cannot be used as the identification number of the wireless communication terminal.

As one of such methods, there has been known a technology of updating just MAC address when a DoS attack occurs or periodically as disclosed in the non-patent document 4 by the inventor of the present invention. According to this technology, an access point computes a hash function using a hash key and random number shared by a current MAC address for any wireless communication terminal so as to issue a next MAC address. Then, when an attack occurs, the wireless communication terminal requests the access point for updating and the access point notifies of a random number so that the MAC address is synchronized on the wireless communication terminal side and the access point side.

This technology has an effect never seen conventionally as a technology which can avoid the trace of a terminal and DoS attack to be carried out targeting at an identification number without changing the communication system largely.

However this method allows such an attack until the MAC address is updated by receiving a new random number and thus, if a strong attack occurs, communication might be stacked considerably. Therefore, a technology which can update the MAC address faster is required.

Patent document 3: Japanese Patent Application Laid-Open (JP-A) No. 2002-268950

Non-Patent Document 1: 3rd Generation Partnership Project, "3G Security; Security architecture (Release 6)" 3GPP TS 33.102, V6.3.0, 2004

Non-patent document 2: LAN MAN Standards Committee of the IEEE Computer Society, "IEEE Standard for Local and Metropolitan Area Networks—Port-Based Network Access Control", IEEE Standard 802.1x, 2001

Non-patent document 3: LAN MAN Standards Committee of the IEEE Computer Society, "IEEE802.11 Wireless LAN Medium Access Control (MAC) and Physical Layer (PHY) specifications—Amendment 6: Medium Access Control (MAC) Security Enhancements," IEEE Standard 802.11i, 2004

Non-patent document 4: D. Inoue, R. Nomura, M. Kuroda "Transient MAC Address Scheme for Untraceability and DoS Attack Resiliency on Wireless Network" Proc. 4th annual Wireless Telecommunications Symposium, 2005.

Non-patent document 5: William A. Arbaugh, Narendar Shankar, Y. C. Justin Wan and Kan Zhang, "Your 802.11 Wireless Network has No Clothes," IEEE Wireless Communications, Volume 9, Issue 6, pp. 44-51, 2002

DISCLOSURE OF THE INVENTION

Problem to be Solved by the Invention

The present invention has been accomplished in views of the problems possessed by the related art and an object of the present invention is to provide a technology of avoiding tracing on a terminal performed with an identification number as a target and DoS attack effectively without making any significant changes on a general wireless communication system.

Means for Solving the Problems

To solve the above-described object, the present invention provides a following wireless communication system. That is, the identification number of a wireless communication terminal such as the MAC (Media Access Control) address is changed dynamically to protect from a trace on a terminal or DoS attack thereby avoiding the attack performed with the identification number as a target. At this time, continuity of communication is maintained with the identification number synchronized with an access point.

The invention according to a first aspect of the present invention is a wireless communication system constituted of a singular or plural wireless communication terminals and at least a corresponding access point and the wireless communication system has a following configuration.

The access point includes at least an identification number storage portion for storing stores a current and next identification number inherent of the wireless communication terminal; a key storage portion for storing a hash key shared between the wireless communication terminals; a random number generation processing portion for generating a random number; a hash function arithmetic operation processing portion for carrying out arithmetic operation processing with a key provided hash function; and a control communication processing portion which carries out communication with the wireless communication terminal and executes a control processing for each processing portion.

The access point generates a second identification number using a current number, a hash key and a first random number for any wireless communication terminal under a control of the control communication processing portion by the hash function arithmetic operation processing portion, and further generates a third identification number using the second identification number, hash key and second random number.

The control communication processing portion sends an initialization instruction signal containing the first and second random numbers to the wireless communication terminal, updates a current identification number stored in the identification number storage portion to a second identification number and sets up a next identification number on a third identification number.

The wireless communication terminal includes at least a communicating portion which communicates with the access point; a self number storage portion which stores a current and next identification numbers inherent of self; a key storage portion which stores a hash key shared between the access points; and the hash function arithmetic operation processing portion for executing arithmetic operation processing with a key provided hash function.

When the communicating portion receives the initialization instruction signal from the access point, the hash function arithmetic operation processing portion generates a second identification number using the current identification number stored in the self number storage portion, hash key and the first random number further, generates a third identification number using the second identification number, hash key and the second random number, updates the current identification number stored in the self number storage portion to a second identification number and sets up a next identification number on a third identification number.

The technology of a second aspect of the present invention concerns a technology of updating the identification number periodically. The control communication processing portion of the access point, after receiving the initialization instruction signal at least once or more, sends the update instruction signal to the wireless communication terminal by a predetermined cycle.

The hash function arithmetic operation processing portion generates a fourth identification number using a next identification number, hash key and third random number for any wireless communication terminal under a control of the control communication processing portion, and the control communication processing portion sends an update instruction signal containing the third random number to the wireless communication terminal, updates a current identification number stored in the identification number storage portion to a next identification number and further updates the next identification number to the fourth identification number.

On the other hand, when the communicating portion of the wireless communication terminal receives the update instruction signal from the access point, the hash function arithmetic operation processing portion generates the fourth identification number using the next identification number stored in the self number storage portion, the hash key and the third random number, updates the current identification number stored in the self number storage portion to the next identification number and further updates the next identification number to the fourth identification number.

The technology of a third aspect of the present invention concerns a technology of updating the identification number at an urgent time in which an attack is received.

According to this configuration, the wireless communication terminal has an attack detection processing portion for detecting Denial of Service (DoS) attack by measuring the amount of communication per unit time, updates a current identification number stored in the self number storage portion to a next identification number when the attack is detected, and the communicating portion sends an attack detection signal to an access point.

Next, when the control communication processing portion of the access point receives the attack detection signal, updates the current identification number stored in the identification number storage portion to a next identification number and the hash function arithmetic operation processing portion generates the fourth identification number using the current identification number after updated, hash key and third random number, and the control communication processing portion sends a random notification signal containing the third random number to the wireless communication terminal and updates the next identification number to the fourth identification number.

Next when the communicating portion of the wireless communication terminal receives the random number notification signal, the hash function arithmetic operation processing portion generates the fourth identification number using the current identification number after updated, stored in the self number storage portion, the hash key and the third random number, and updates the next identification number stored in the self number storage portion to the fourth identification number.

The technology of a fourth aspect of the present invention concerns a configuration in which the communicating portion of the wireless communication terminal, when receiving an initialization instruction signal or an update instruction signal from the access point, sends an acknowledge signal to the access point.

The control communication processing portion of the access point, when receiving the acknowledge signal, updates the current identification number and next identification number stored in the identification number storage portion.

The invention of a fifth aspect of the present invention uses a configuration in which the access point is so constructed that the identification number storage portion is capable of storing a current identification number before updated, a current identification number after updated and a next identification number after updated.

The invention of a fifth aspect of the present invention is characterized in that the control communication processing portion includes: a detecting portion which when receiving a communication from any identification number from the wireless communication terminal before the acknowledge signal is received, detects the communication; and an identification number synchronization control portion which if the result of detection is a current identification number before updated, sends the update instruction signal again and if the result of detection is a next identification number after updated, updates the current identification number before updated, stored in the identification number storage portion to the next identification number after updated.

According to the invention of a sixth aspect, the access point has a timer portion which starts counting of time since a signal is sent by the control communication processing portion, while the control communication processing portion includes an existence acknowledge signal sending portion and the communicating portion of the wireless communication terminal includes an existence acknowledge responding portion for sending an existence acknowledge response when the existence acknowledge signal is received.

If the acknowledge signal is incapable of being received when the timer portion detects that a predetermined time is elapsed since the update instruction signal is sent, the existence acknowledge signal sending portion sends the existence acknowledge signal to a next identification number of the wireless communication terminal.

The control communication processing portion, if the existence acknowledge response is incapable of being received although the timer portion detects that the predetermined time is elapsed, sends the update instruction signal again and if the existence acknowledge response is received, updates the current identification number described in the identification number storage portion to a next identification number.

The invention of a seventh aspect is a wireless communication system having the same configuration as described above. The access point comprises at least an identification number storage portion for storing an identification number inherent of the wireless communication terminal; a key storage portion for storing a hash key shared between the wireless communication terminals; a random number generation processing portion for generating a random number; a hash function arithmetic operation processing portion for carrying out arithmetic operation processing with a key provided hash function; and a control communication processing portion which controls communication with the wireless communication terminal, and executes a control processing for each processing portion.

The hash function arithmetic operation processing portion generates a second identification number using a current identification number, a hash key and a random number for any wireless communication terminal under a control of the control communication processing portion, and the control communication processing portion sends the update instruction signal containing the random number to the wireless communication terminal at least by a predetermined cycle and updates a current identification number stored in the identification number storage portion to a second identification number.

On the other hand, the wireless communication terminal includes at least a communicating portion which communicates with the access point; a self number storage portion which stores an identification number inherent of self;

a key storage portion which stores a hash key shared between the access points; and the hash function arithmetic operation processing portion for executing arithmetic operation processing with a key provided hash function.

When the communicating portion receives the initialization instruction signal from the access point, the hash function arithmetic operation processing portion generates a second identification number using the current identification number stored in the self number storage portion, hash key and the random number further, updates the current identification number stored in the self number storage portion to a second identification number.

According to the invention of an eighth aspect, the identification number of the wireless communication terminal is MAC (Media Access Control) address.

The invention of a ninth aspect provides a communication method for wireless communication system constituted of a singular or plural wireless communication terminals and at least a corresponding access point.

According to the present method, the access point and the wireless communication terminal share a hash key and store it in each key storage portion, and the communication method includes an access point side identification number generating step in which the hash function arithmetic operation processing portion of an access point generates a second identification number using a current identification number, a hash key and a first random number for any wireless communication terminal under a control of the control communication processing portion of the access point and further generates a third identification number using the second identification number, the hash key and the second random number.

An initialization instruction step in which the control communication processing portion sends an initialization instruction signal containing the first and second random numbers to the wireless communication terminal is possessed.

An access point side identification number initialization step of updating a current identification number stored in the identification number storage portion to a second identification number at any time after the access point side identification number generation step and further setting a next identification number on a third identification number is possessed.

Further, a terminal side identification number generation step in which when the communicating portion of the wireless communication terminal receives the initialization instruction from the access point, the hash function arithmetic operation processing portion generates a second identification number using a current identification number stored in the self number storage portion, hash key and the first random number and further generates a third identification number using the second identification number, the hash key and the second random number and a terminal side identification number initialization step of updating a current identification number stored in the self number storage portion to a second identification number and further setting a next identification number on a third identification number are possessed.

According to the invention of a tenth aspect, the control communication processing portion of the access point, after receiving the initialization instruction signal at least once or more, sends the update instruction signal to the wireless communication terminal by a predetermined cycle and the wireless communication method includes an access point side identification number periodic generation step of generating a fourth identification number using a next identification number, hash key and third random number for any wireless communication terminal under a control of the control communication processing portion and an update instruction step in which the control communication processing portion sends an update instruction signal containing the third random number to the wireless communication terminal.

Further, an access point side identification number periodic update step of updating the current identification number stored in the identification number storage portion to a next identification number at any time after the access point side identification number periodic generation step and further updating the next identification number to the fourth identification number is possessed.

Further, a terminal side identification number periodic generation step in which when the communicating portion of the wireless communication terminal receives the update instruction signal from the access point, the hash function arithmetic operation processing portion generates a fourth identification number using the next identification number stored in the self number storage portion, the hash key and the third random number and a terminal side identification number periodic updating step of updating the current identification number stored in the self number storage portion to a next identification number and further updating the next identification number to the fourth identification number are possessed.

The invention of an eleventh aspect is a wireless communication method upon updating the identification number at an urgent time. This method includes a DoS attack detecting step in which the attack detection processing portion of the wireless communication terminal detects a DoS attack by measuring the amount of communication per unit time at any timing after the terminal side identification initialization step of the wireless communication method, a terminal side identification number urgent update step in which when an attack is detected, the current identification number stored in the self number storage portion is updated to a next identification number while the communicating portion sends an attack detection signal to the access point, an access point side identification number urgent update step in which when the control communication processing portion of the access point receives the attack detection signal, the current identification number stored in the identification number storage portion is updated to a next identification number while the hash function arithmetic operation processing portion generates a fourth identification number using the current identification number after updated, the hash key and the third random number and the control communication processing portion sends a random number notification signal containing the third random number to the wireless communication terminal and updates the next identification number to the fourth identification number.

Further, a terminal side identification number urgent update step in which when the communicating portion of the wireless communication terminal receives the random number notification signal, the hash function arithmetic operation processing portion generates the fourth identification number using the current identification number after updated, stored in the self number storage portion, the hash key and the third random number and updates the next identification number stored in the self number storage portion to the fourth identification number is possessed.

According to the invention of a twelfth aspect, the wireless communication method further includes, subsequent to the initialization instruction step and the update instruction step, an acknowledge signal sending step in which the communicating portion of the wireless communication terminal sends an acknowledge signal to the access point, wherein the control communication processing portion of the access point executes the access point side identification number initialization step or the access point side identification number periodic update step after the acknowledge signal receiving step of receiving the acknowledge signal.

According to the invention of a thirteenth aspect, the wireless communication method further includes, between the acknowledge signal sending step and the acknowledge signal receiving step, a detection step in which the current identification number before updated, the current identification number after updated and the next identification number after updated, of the wireless communication terminal are stored in the identification number storage portion of the access point at the same time, while the detecting portion provided on the control communication processing portion detects whether or not any communication occurs from an identification number in the wireless communication terminal, wherein if the result of detection is the current identification number before updated, the procedure is returned to the update instruction step and if the result of the detection is a next identification number after updated, steps after the access point side identification number urgent update step are executed.

According to the invention of a fourteenth aspect, the wireless communication method including an existence acknowledge step in which unless the acknowledge signal receiving step is reached even if the timer portion of the access point detects that a predetermined time is elapsed since the update instruction step, the existence acknowledge signal sending portion provided on the control communication processing portion of the access point sends the existence acknowledge signal to the next identification number of the wireless communication terminal. If the existence acknowledge response to the existence acknowledge signal from the wireless communication terminal is incapable of being received within a predetermined time, the procedure is returned to the update instruction step.

On the other hand, if the existence acknowledge response is received, the access point side identification number periodic update step is executed.

The invention of a fifteenth aspect provides a communication method for wireless communication system constituted of a singular or plural wireless communication terminals and at least a corresponding access point. The access point and the wireless communication terminal share a hash key and store it in each key storage portion in order to execute following steps:

(1) access point side identification number generating step in which the hash function arithmetic operation processing portion of an access point generates a second identification number using a current identification number, a hash key and a random number for any wireless communication terminal under a control of the control communication processing portion of the access point, (2) update instruction step in which the control communication processing portion sends the update instruction signal containing the random number to the wireless communication terminal at least by a predetermined cycle, (3) a terminal side identification number generation step in which when the communicating portion of the wireless communicating terminal receives the update instruction signal from the access point, the hash function arithmetic operation processing portion generates the current identification number stored in the self number storage portion, the hash key and the random number, (4) a terminal side identification number update step of updating the second identification number stored in the self number storage portion of the wireless communication terminal to the second identification number, and (5) an access point side identification number updating step of updating the current identification number stored in the identification number storage portion of the access point to the second identification number at any time after the update instruction step.

The invention of a sixteenth aspect provides a communication method wherein the identification number of the wireless communication terminal is MAC (Media Access Control) address.

EFFECT OF THE INVENTION

According to the present invention, the access point and the wireless communication terminal have an identification number to be updated next and accordingly, when the wireless communication terminal detects any attack, the identification number can be changed immediately to avoid the attack.

By changing the identification number periodically, any trace on a terminal is difficult to implement. Further because the identification number can be changed urgently when the wireless communication terminal detects a DoS attack, damage by the DoS attack can be reduced.

Particularly, by possessing an identification number before updated, an identification number after updated and further a next identification number at an access point, even if any trouble is generated in communication between the access point and the wireless communication terminal upon updating, resynchronization can be executed effectively.

DESCRIPTION OF REFERENCE NUMERALS

Figure 1:
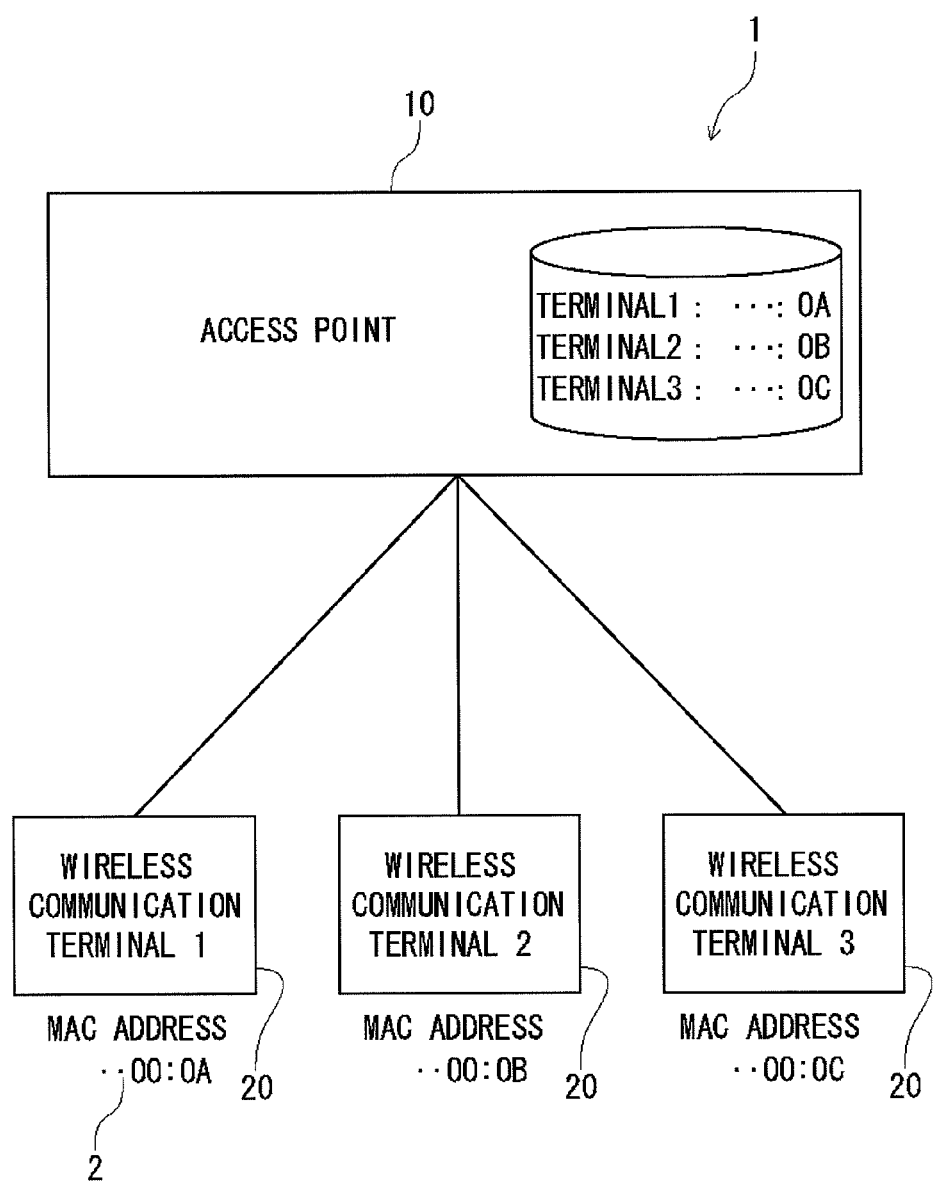
FIG. 1 is an entire configuration diagram of the wireless communication system of the present invention.

1: wireless communication system
2: MAC address
10: access point
11: arithmetic operation means
111: random number generation processing portion
112: hash function arithmetic operation processing portion
113: control communication processing portion
114: detecting portion
115: identification number synchronization control portion
12: memory means
121: identification number storage portion
122: key storage portion
13: network card
20: wireless communication terminal
21: network card
22: arithmetic operation means
221: communicating portion
222: hash function arithmetic operation processing portion
223: attack detection processing portion
23: memory means 231: self number storage portion
232: key storage portion

BEST MODE FOR CARRYING OUT THE INVENTION

Hereinafter, the embodiments of the present invention will be described based on the examples shown in the accompanying drawings. In the meantime, the embodiments are not restricted to the ones described below.

Figure 2:
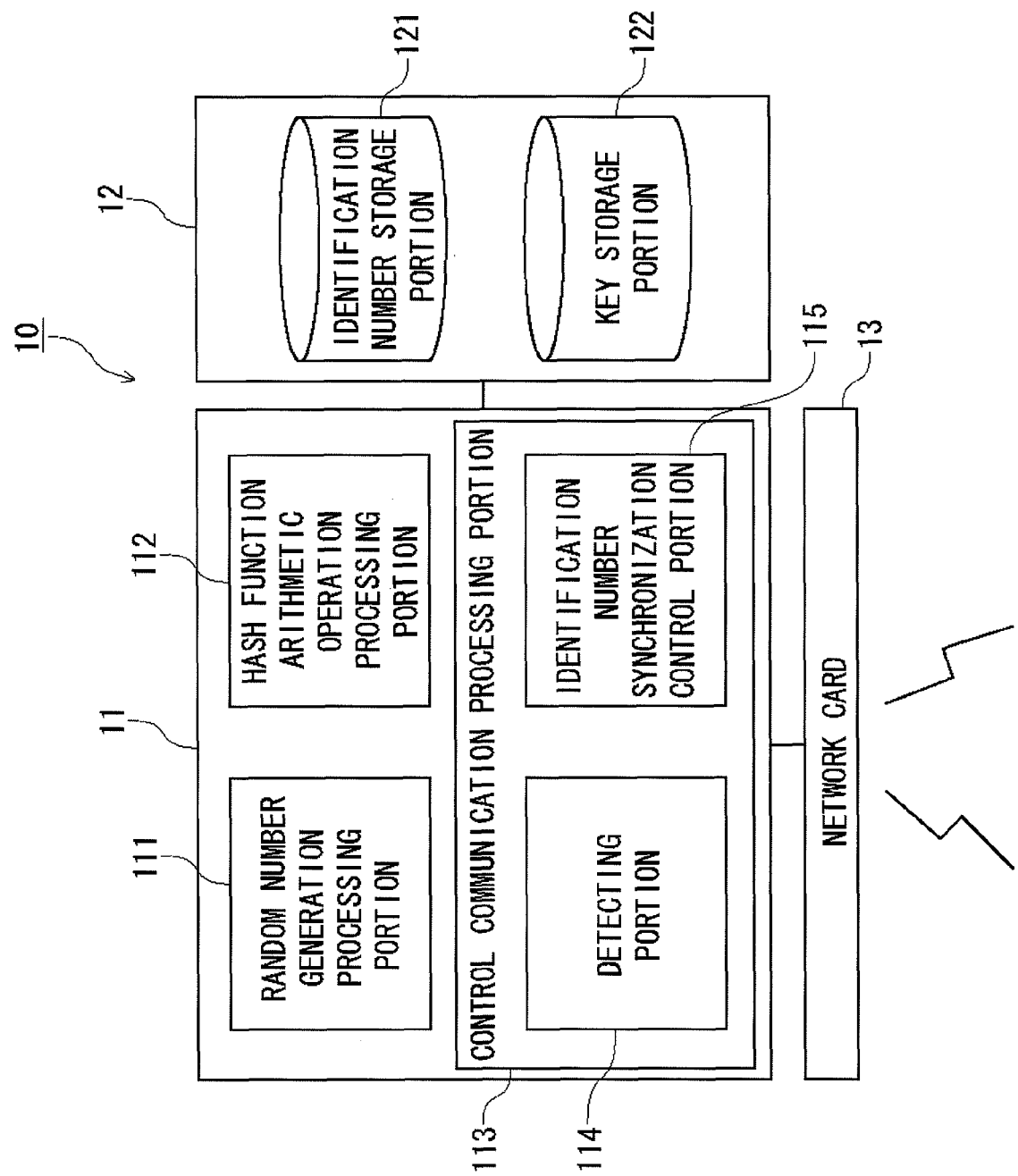
FIG. 2 is a configuration diagram of an access point (first embodiment) of the present invention.
Figure 3:
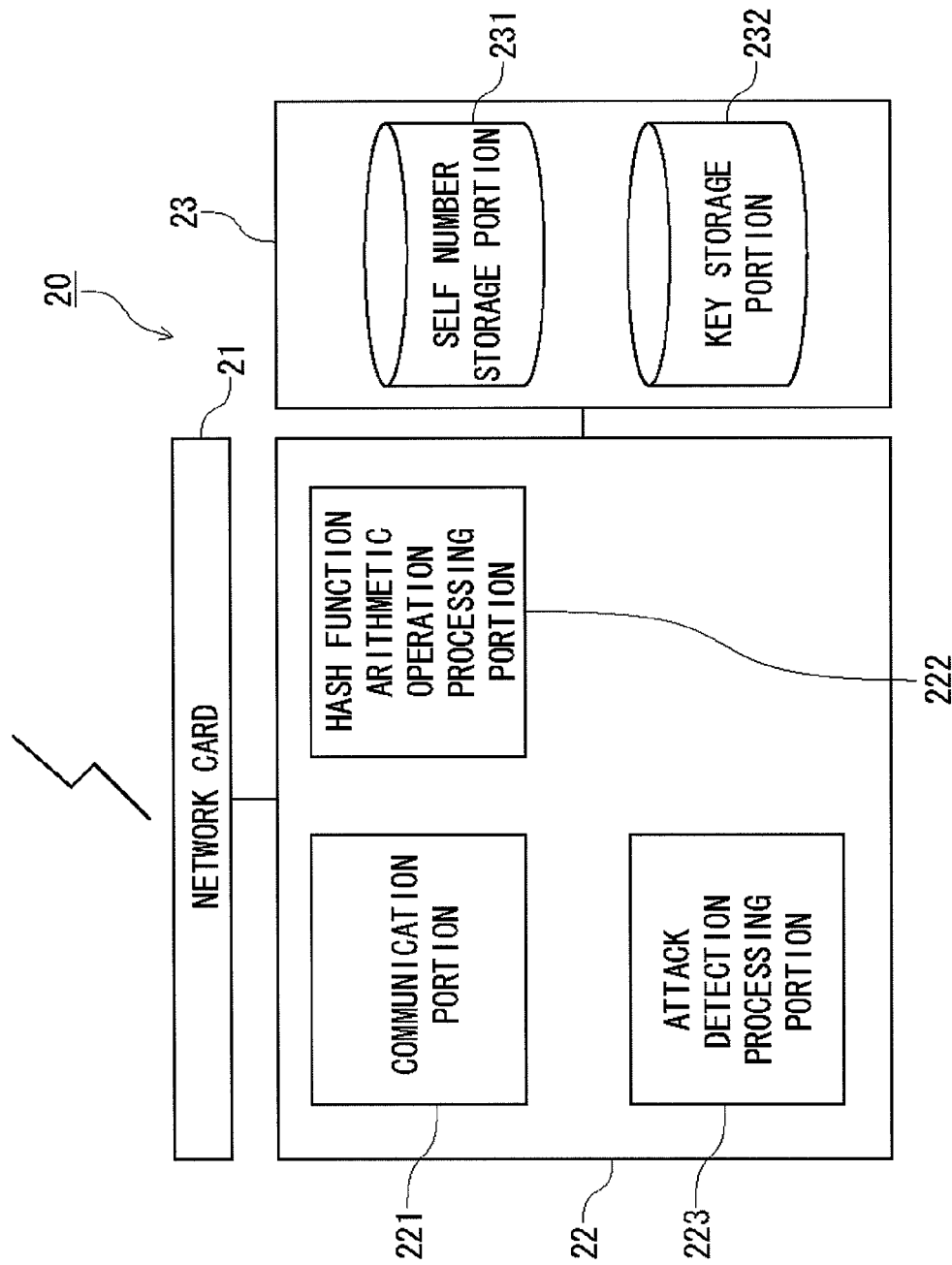
FIG. 3 is a configuration diagram of a wireless communication terminal (first embodiment) of the present invention.

FIG. 1 is an entire structure diagram of the wireless communication system of the present invention, FIG. 2 is a configuration diagram of access point and FIG. 3 is a configuration diagram of the wireless communication terminal.

As shown in FIG. 1, the wireless communication system (1) is composed of at least one access point (10) and singular or plural wireless communication terminals (20) capable of communicating therewith.

In a process of communication, the access point (10) and the wireless communication terminal (20) identify a terminal according to the MAC address (2) which is an identification number of the wireless communication terminal as well known and the MAC address of each terminal is stored in the memory portion such as a memory on the access point side.

The MAC address is used in the MAC (Media Access Control) which is transmission control technology for use in the LAN. The MAC stipulates frame (data transmission/reception unit) transmission/reception method, frame format, error detection method and the like.

In principle, the MAC address is allocated as an identification number inherent in a global network and 48 bits are defined for a network interface card (NIC). Its first 24 bits are an identification number inherent of a vendor controlled by IEEE and its last 24 bits are continuous number of each NIC.

However, these numbers can be changed easily by a control of software as described in the non-patent document 5.

If the MAC address is changed in this method, global characteristic property cannot be secured and if an identical MAC address exists in an identical local area, conflict can occur. However, unless any identical MAC address exists in a certain local area, troubles such as a conflict never occur even if the characteristic property cannot be secured in the global network.

To secure the characteristic property of the identification number in such a local area, each wireless communication terminal cannot change its own MAC address independently. Thus, the access point needs to possess an initiative for changing the MAC address of each wireless communication terminal and this application concerns a technology about processing in the access point for that purpose, processing at the wireless communication terminal, particularly synchronization method for the identification numbers of the both.

It is presumed in the present embodiment that communication is carried out using three keys. That is, as the keys, an encryption key for encrypting a frame main body, an authentication key for computing a message authentication code and a TMAC key which is a hash key for use in calculation upon changing of the MAC address in this application are used.

The method sharing these keys can use well known technology. Likewise, for encryption and authentication of a frame to be transmitted, a known technology may be used and it is preferable to use this together with the MAC address changing technology of the present application.

The access point of the present application is provided with several mechanisms for communicating with the wireless communication terminal such as known wireless LAN access point and further includes following characteristics.

That is, the access point (10) includes an arithmetic operating means (11), a memory means (12) and a network card (13) having an antenna for controlling actual communication.

The arithmetic operating means (11) has a random number generation processing portion (111), a hash function arithmetic operation processing portion (112) and a control communication processing portion (113). The control communication processing portion (113) carries out a control processing relating to changing of the MAC address of the present invention, controls communication processing for sending of an instruction signal and receiving of acknowledgement signal and particularly includes a detecting portion (114) and an identification number synchronization control portion (115).

The memory means (12) further includes an identification number storage portion (121) which stores an identification number (MAC address) of the wireless communication terminal for communication and a key storage portion (122) which stores the above-mentioned encryption key, authentication key and TMAC key for use for communication. Needless to say, these may be stored in a single memory.

As shown in FIG. 3, the wireless communication terminal device (20) includes a network card (21) having an antenna for communicating with the network card (13), an arithmetic operation means (22) and a memory means (23).

The arithmetic operating means includes a communicating portion (221) for controlling the network card (21) to control communication, a hash function arithmetic operation processing portion (222) and an attack detection processing portion (223).

The memory means (23) further includes a self number storage portion (231) which stores a self-identification number (MAC address) and a key storage portion (232) which stores the encryption key, authentication key and TMAC key for use in communication. These are stored on a single memory.

With the above-described structure, the access point (10) and the wireless communication terminal (20) of the present invention are based on three kinds of control signal communications, that is, initialization control upon setting the MAC address first, periodic update control upon updating the MAC address periodically and urgent update control for updating the MAC address when an attack occurs.

These communications are carried out between the control communication processing (113) at the access point (10) and the communicating portion (221) of the wireless communication terminal (20).

The initialization control will be described. The initialization control is a first step for introduction of the technology of the present invention with communication enabled by holding a MAC address at the wireless communication terminal (20) and the access point (10).

Figure 4:
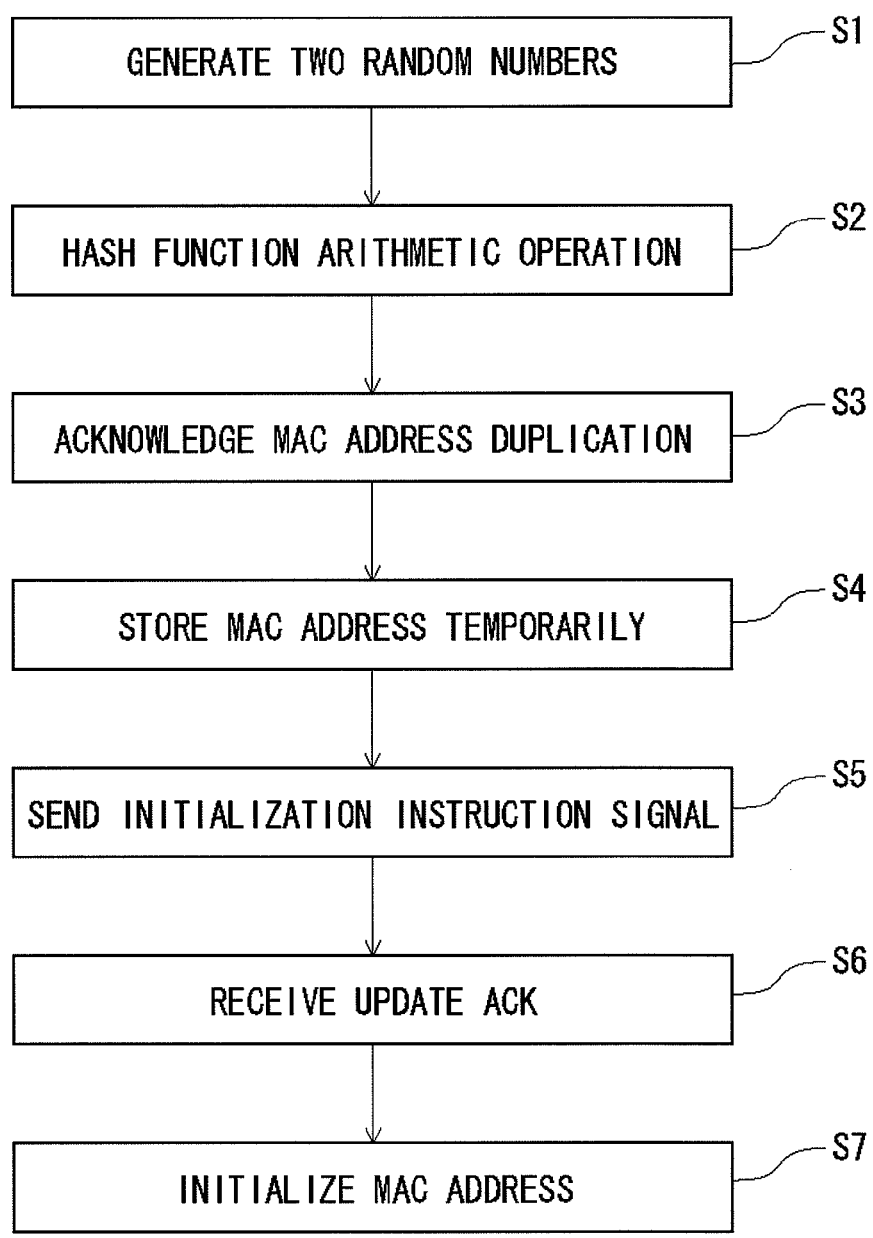
FIG. 4 is a flow chart of processing at an access point.

FIG. 4 is a flow chart of the initialization control. First, a random number generation processing portion (111) generates two kinds of random numbers (first radon number) $Rand_0$ and (second random number) $Rand_1$ (S1). The two random numbers are generated corresponding to a MAC address of the current wireless terminal.

Next, the hash function arithmetic operation processing portion (112) computes a second and third new MAC address $TMAC_1$ and $TMAC_2$ using a hash function shown in the equation 1 using the current MAC address $TMAC_0$ and the generated random numbers $Rand_0$, $Rand_1$ (S2). As evident from the equation, the $TMAC_2$ is computed using a computation result of the $TMAC_1$. On the other hand, the hash function is known and an existing arithmetic operation method may be used.

(Equation 1)

In the aforementioned equation, h( ) is a hash function and K is a TMAC key shared by the access point and the wireless communication terminal.

Duplicate acknowledgement is carried for a calculated MAC address to see whether or not a duplicate MAC address exists within a local area of the hash function arithmetic operation processing portion (S3). At this time, three keys, that is, a current key ($TMAC_0$ in the above example) before update, a current key ($TMAC_1$ in the above example) after update, and a next key in the above example) after update can be stored about each wireless communication terminal in the identification number storage portion (121) and thus, in such a configuration, it is verified whether or not new and old identification numbers are duplicated.

If the duplicate MAC address exists, the procedure returns to the random number generation step (S1), in which the processings of S2, S3 are carried out. Consequently, the characteristic property of the MAC address in the local area is secured.

Unless there is any problem in confirming on the duplication check (S3), the two MAC addresses are stored in a memory temporarily (S4).

Access point side identification number generation step concerning S1?S4 is terminated.

Then, as an initialization instruction step, the control communication processing portion (113) sends an initialization instruction signal to the wireless communication terminal (S5).

The initialization instruction signal contains the two random numbers $Rand_0$ and $Rand_1$ generated above.

Figure 5:
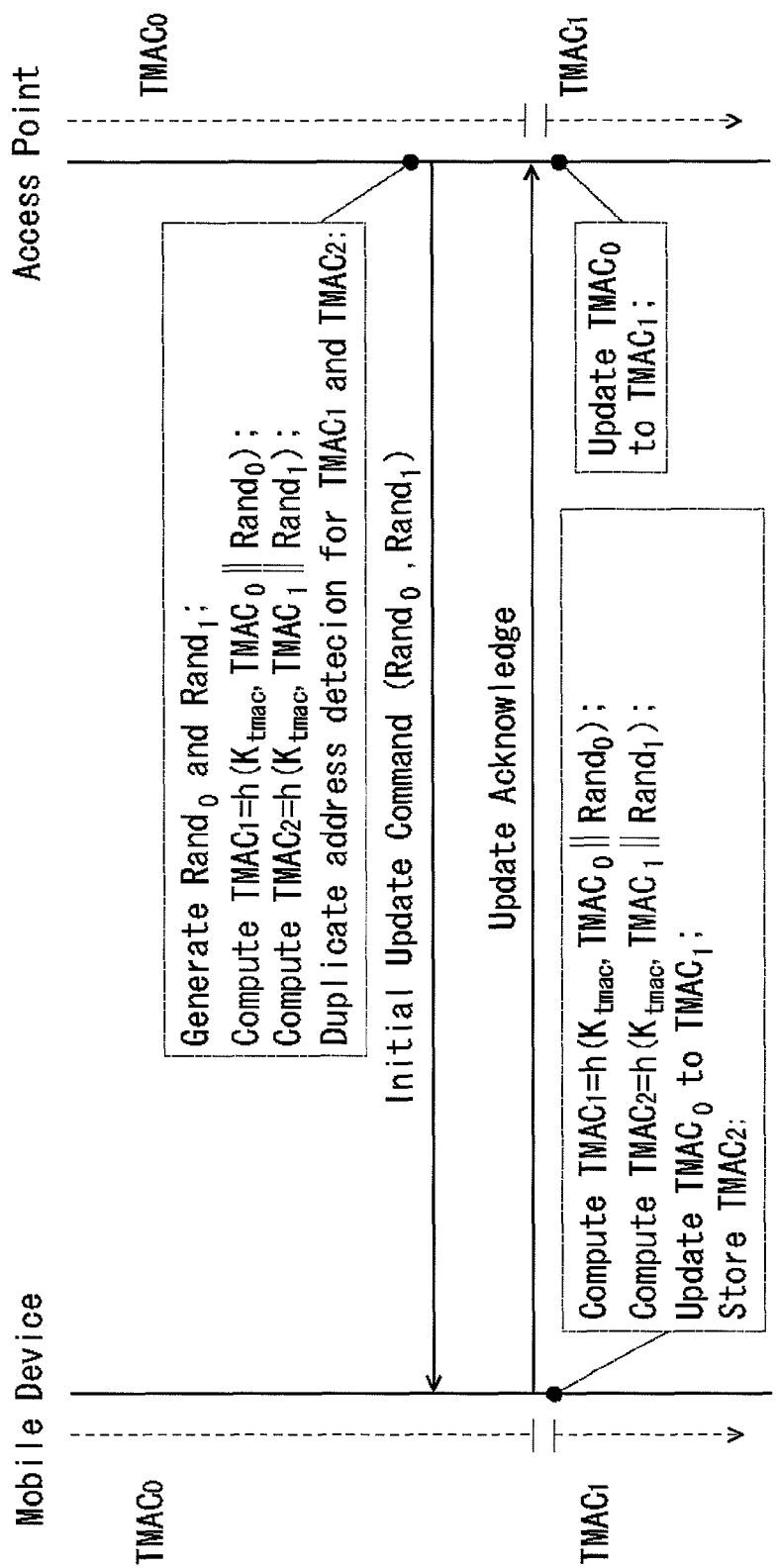
FIG. 5 is a sequence diagram at the time of initialization control.

FIG. 5 is a sequence diagram of the initialization control. A dotted line at the left end of FIG. 5 indicates how the wireless communication terminal (Mobile Device) recognizes the self MAC address and a dotted line at the right end indicates how the access point (Access Point) recognizes the MAC address of the wireless communication terminal.

A destination of the initialization instruction signal (Initial Update Command) is $TMAC_0$ of a current MAC address.

Usually, after the initialization instruction signal is received by the communicating portion (221), an acknowledge signal Update Acknowledge is returned to the access point from the wireless communication terminal and received (S6).

In the access point side identification number initialization step, the control communication processing portion stores $TMAC_1$ as a current MAC address of the wireless communication terminal in the identification number storage portion (121) and $TMAC_2$ as a next MAC address.

Consequently, the MAC address of the wireless communication terminal is recognized with the $TMAC_1$ as a basic in the access point. According to this technology, by storing both the $TMAC_0$ and $TMAC_2$ so as to enable communication, communication from any MAC address can be achieved.

At the same time, the wireless communication terminal sends an acknowledge signal and carries out the same arithmetic operation as in the above-mentioned access point in the hash function arithmetic operation processing portion (222) so as to calculate the MAC addresses $TMAC_1$ and $TMAC_2$ to be changed using a random number received by the initialization instruction signal. This is terminal side identification number generation step.

Subsequently, as the terminal side identification number initialization step, a current MAC address stored in the self number storage portion (231) is set to $TMAC_1$ and a next MAC address is set to $TMAC_2$ and it behaves as a wireless communication terminal of the $TMAC_1$.

The processing for the initialization control has been described above. After such initialization, periodic update control for updating the MAC address periodically can be performed.

Figure 6:
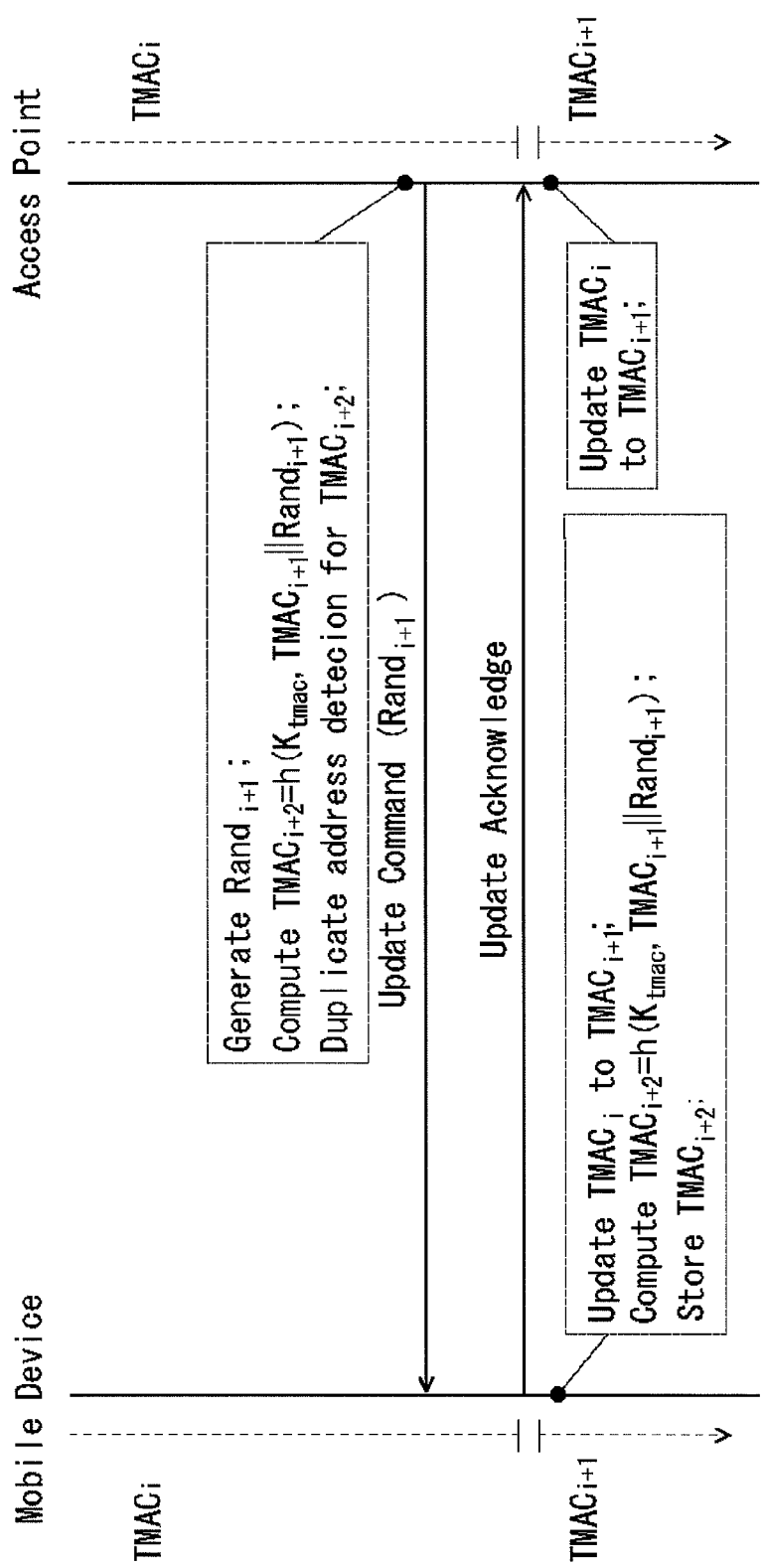
FIG. 6 is a sequence diagram at the time of periodic update control.

FIG. 6 shows a sequence diagram of the periodic update control. The same diagram shows a process of updating from a current MAC address $TMAC_i$ before updating to a current MAC address $TMAC_{1+1}$ after updating. Preferably, the cycle of the periodic updating is for example, 10 seconds, in which each processing is carried out. In such a case, a next update time, update interval and sequential number (transmission number) are recorded for each wireless communication terminal in the memory means of the access point.

Upon periodic updating, the random number generation processing portion (111) generates $Rand_{i+1}$ as a third random number at the access point. Although a first ? third random number are noted here, the expression is changed corresponding to an opportunity using the random number for a description and each case does not has a fixed value. For example, although a terminology of the third random number is used repeatedly each time when periodic update is performed, the random number at each time has a different value.

The hash function arithmetic operation processing portion (112) calculates a next MAC address (fourth MAC address) using the third random number. The "fourth" means, as well as the above-mentioned, a next MAC address when the MAC address before updating is regarded as the second and the MAC address after updating is regarded as the third.

Like the initialization control time, whether or not the fourth MAC address is duplicated is verified. Then, the access point side identification number periodic generation step is terminated.

If there is no problem, the update instruction signal containing the third random number is sent to the communicating portion (221) of the wireless communication terminal as update instruction step.

Usually, an acknowledge signal Update Acknowledge is sent back from the wireless communication terminal which receives an update instruction signal by means of the communicating portion (221) and received. After this reception, the third MAC address calculated previously at an access point is updated to a current MAC address and the fourth MAC address is updated to a next MAC address. This processing is an access point side identification number periodic update step.

On the other hand, the wireless communication terminal sends an acknowledge signal and performs the same arithmetic operation processing as at the above-mentioned access point in the hash function arithmetic operation processing (222) so as to calculate the MAC address $TMAC_{i+1}$ and $TMAC_{i+2}$ to be changed using a random number received by the update instruction signal. This processing is a terminal side identification number periodic generation step.

Subsequently, in the terminal side identification number periodic update step, a current MAC address stored in the self number storage portion (231) is set to $TMAC_{i+1}$ and a next MAC address is set to $TMAC_{i+2}$ and after that, it behaves as a wireless communication terminal of the $TMAC_{i+1}$.

In the wireless communication system of the present invention, urgent MAC address change processing for protecting effectively from the DoS attack is enabled. Next, urgent update processing will be described in detail.

Figure 7:
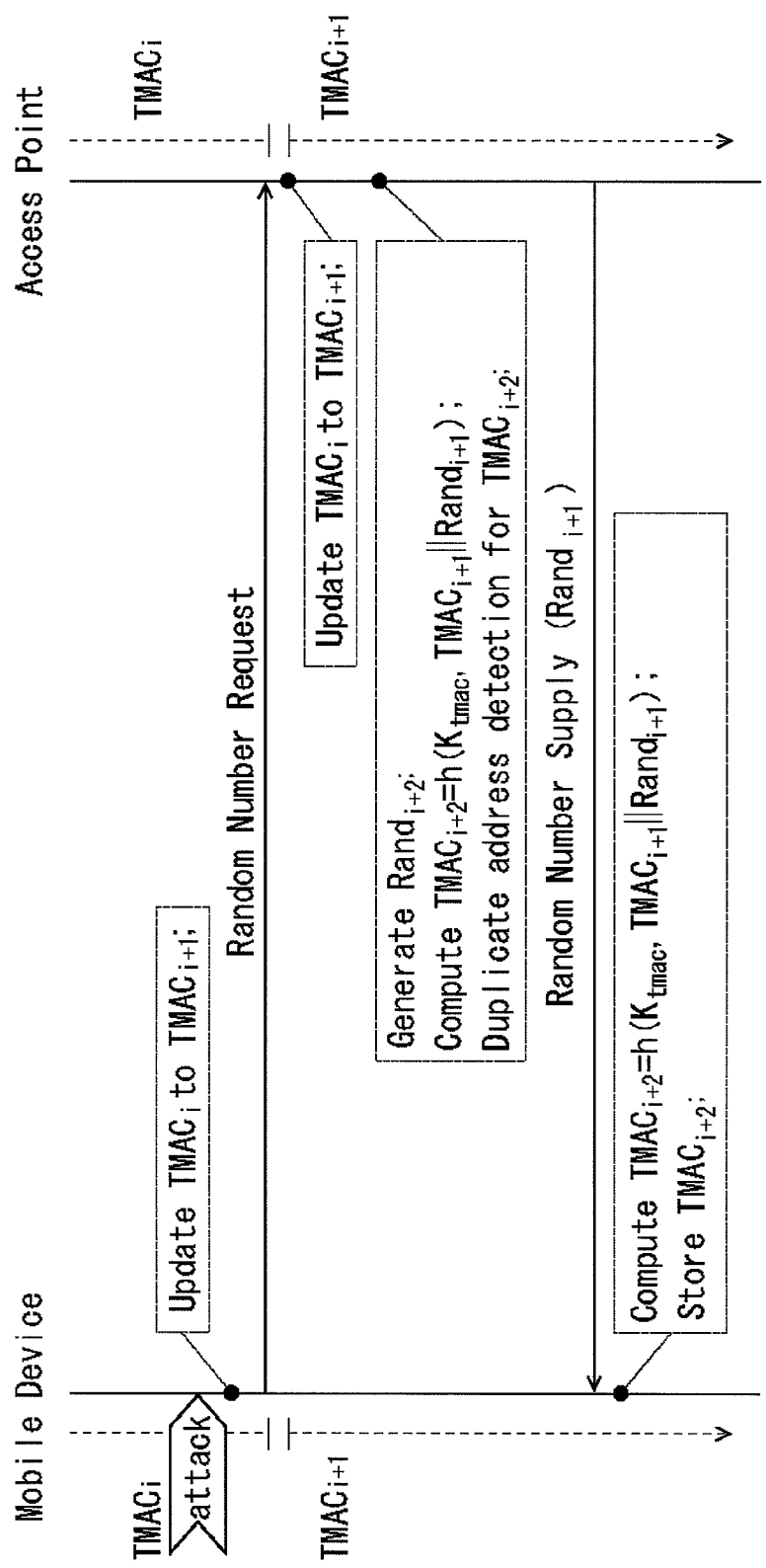
FIG. 7 is a sequence diagram at the time of urgent update control.

FIG. 7 is a sequence diagram of the urgent update processing.

The wireless communication terminal has an attack detection processing portion (223), which if illegal frames are received more than a specified amount, detects that the DoS attack is received. This is urgent update control in the wireless communication method.

According to the present embodiment, when clearly illegal frames or frames containing no message authentication code are received more than a specified number, for example, more than ten frames every second, an attack is detected.

As a terminal side identification number urgent update step, a current MAC address stored in the self number storage portion (231) is changed from $TMAC_i$ to a next MAC address $TMAC_{i+1}$ according to an instruction from the attack detection processing portion (223) immediately. After that, the terminal can avoid that attack in order to behave as a wireless communication terminal of the $TMAC_{i+1}$. The prominent feature of the present application is that the terminal can protect from the DoS attack immediately.

After the MAC address is updated, the communicating portion (221) sends an attack detection signal Random Number Request to the access point (10). Corresponding to the attack detection signal, the control communication processing portion (113) at an access point reads out from the identification number storage portion and updates the MAC address of the wireless communication terminal to $TMAC_{i+1}$. The reason why the access point can receive an attack detection signal from the wireless communication terminal which is a MAC address of the $TMAC_{i+1}$ is that as described above, three MAC addresses are stored in each wireless communication terminal so as to enable communication.

To prepare a next MAC address, the random number generation processing portion (111) generates a new third random number, calculates a fourth MAC address $TMAC_{i+2}$ by means of the hash function arithmetic operation processing portion (112) and after the duplication is inspected, informs the wireless communication terminal (20) of the third random number $Rand_{i+1}$ by means of the random number notification signal (Random Number Supply). The access point side identification number urgent update step has the above-described flow.

Then, the wireless communication terminal (20) calculates $TMAC_{i+2}$ using the received random number $Rand_{i+1}$ and stores it in the self number storage portion (231). Consequently, the terminal side next identification number urgent update step is completed.

A flow of processing at the access point and wireless communication terminal under initialization control, periodic update control and urgent update control has been described above. If each signal reaches the other end securely as shown in FIG. 5 to FIG. 7, the MAC address is updated smoothly by the above-described processing. However, it has been known that a delay or missing occurs in frames of wireless communication, so that proper communication cannot be continued if an ordinary method is applied.

Contrary to this, the feature of the present invention is that normal synchronization is secured even if each signal does not reach.

First, resynchronization processing at the time of periodic update processing of the MAC address will be described. A case where an update instruction signal Update Command is lost before it reaches a wireless communication terminal as shown in FIG. 8 and a case where an acknowledge signal Update Acknowledge is lost without reaching the access point although it has reached a wireless communication terminal as shown in FIG. 9 can be considered.

Figure 8:
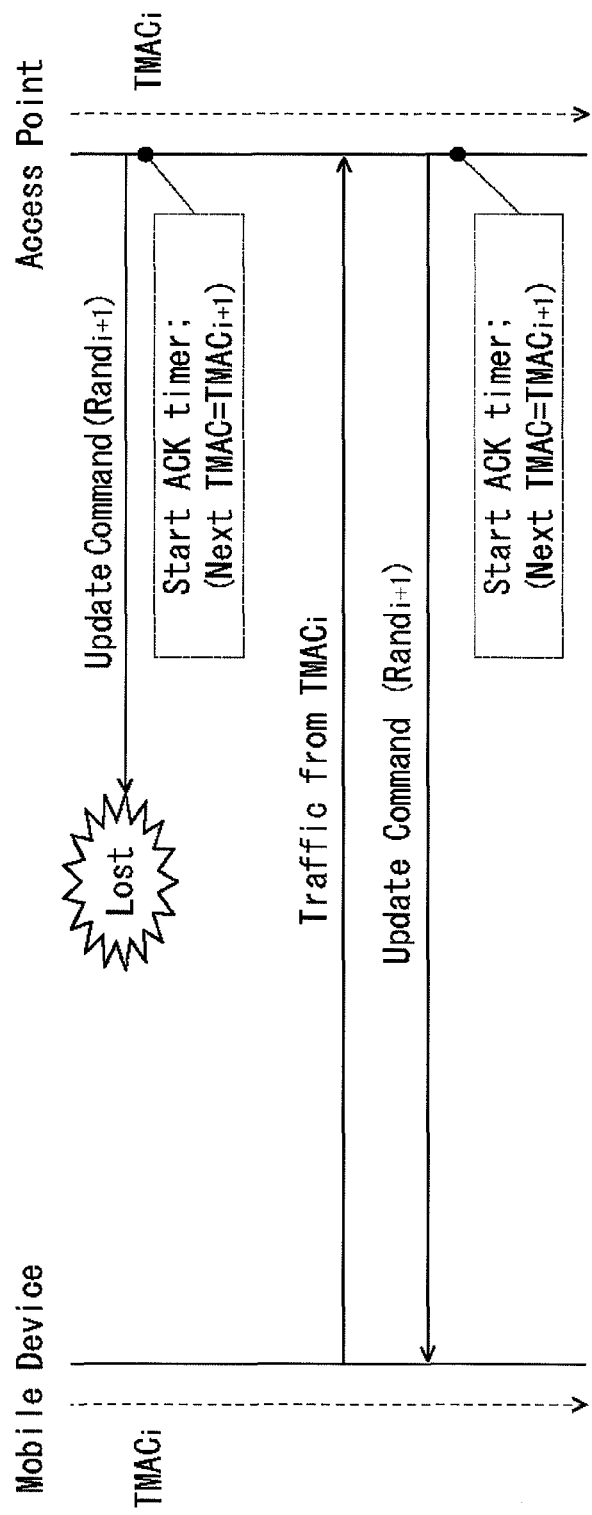
FIG. 8 is a sequence diagram of a case where an update instruction signal is missing halfway.
Figure 9:
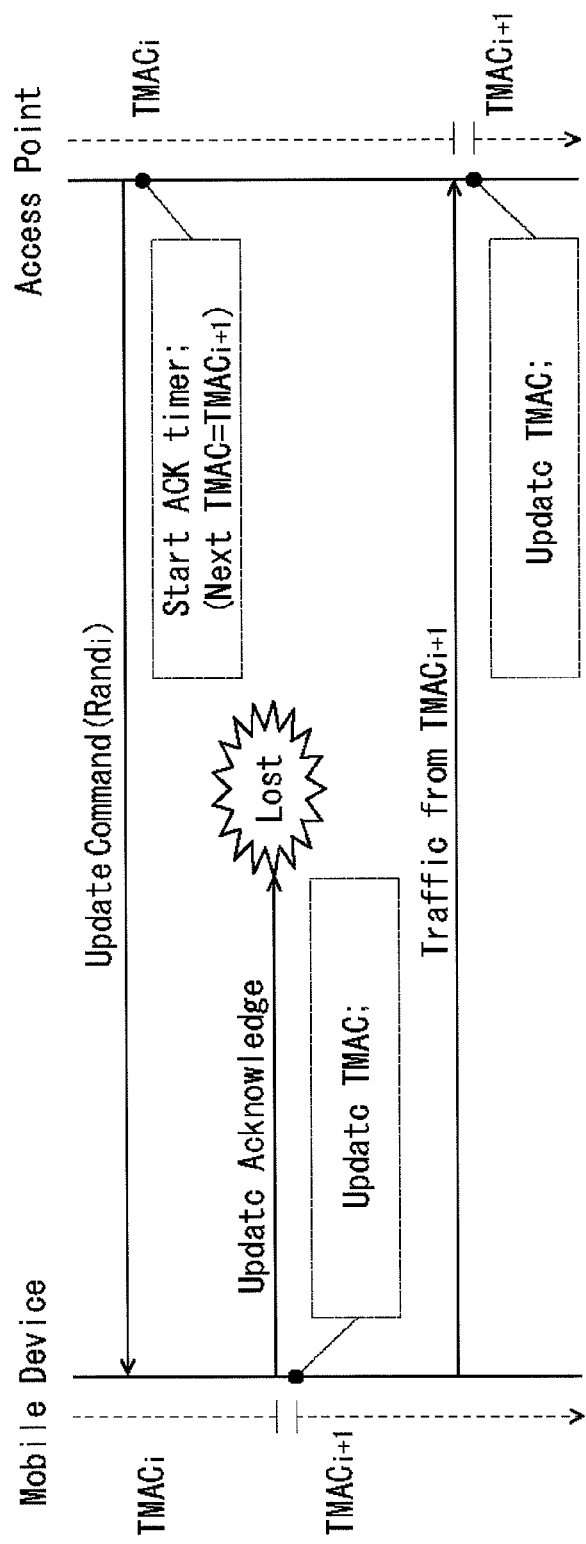
FIG. 9 is a sequence diagram of a case where an acknowledge signal is missing halfway.

If considering the case of FIG. 8, until the acknowledge signal is received from the wireless communication terminal after the update instruction signal is sent, the access point has not updated the MAC address from the $TMAC_i$. Thus, if any communication (Traffic) is received from the wireless communication terminal, this can be received properly.

At this time, the control communication processing portion (113) is provided with the detecting portion (114) and the detecting portion (114) detects which that signal is received from new or old MAC address (detection step).

In case of FIG. 8, the identification number synchronization control portion (115) of the access point can confirm that the update instruction signal has not reached properly when it is detected that it comes from the old address and in that case, the quantity of transmission is increased and as for the random number, the same value $Rand_{i+1}$ as the previous update instruction signal is sent.

On the other hand, if considering the case of FIG. 9, the MAC address is changed on the wireless communication terminal side because the update instruction signal has reached the wireless communication terminal. However, the MAC address is not updated from the $TMAC_i$ on the access point side because the acknowledge signal does not reach the access point.

In this case, if any communication is received from the wireless communication terminal, the detecting portion (114) of the control communication processing portion can recognize that the communication is a communication from the wireless communication terminal by referring to the $TMAC_{i+1}$ stored in the identification number storage portion (121).

Further, the identification number synchronization control portion (115) can recognize that the previous update instruction signal has reached and no acknowledge signal has reached by the arrival of this communication. Then, the identification number synchronization control portion (115) executes a processing of changing the MAC address of the wireless communication terminal by the same processing as the access point side identification number periodic update step.

In the above two cases, because both current MAC addresses before update and after update are stored in the identification number storage portion (121), the detecting portion (114) and the identification number synchronization control portion (115) operate to execute resynchronization of accurate MAC address.

Figure 10:
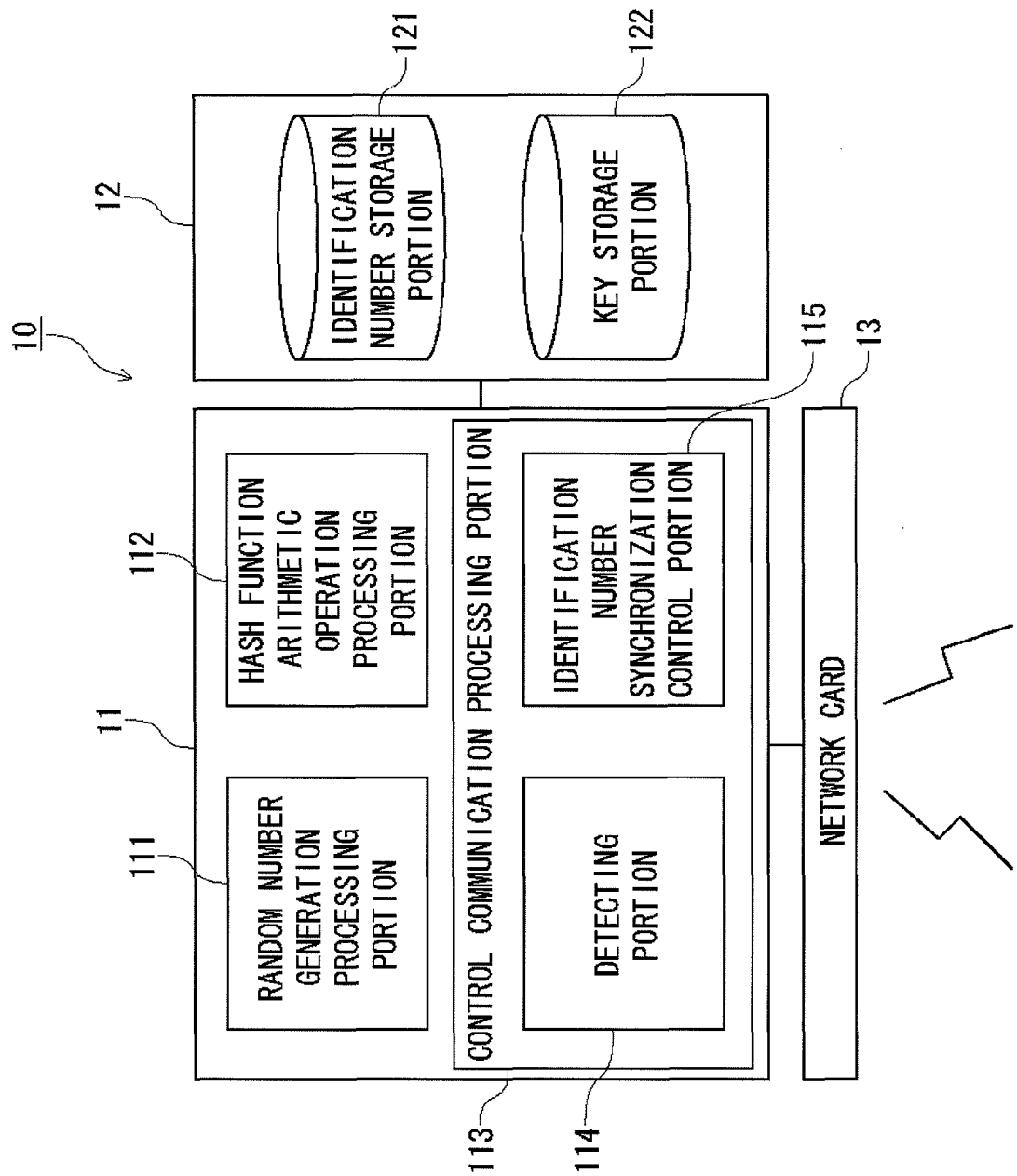
FIG. 10 is a configuration diagram of an access point (second embodiment) of the present invention.
Figure 11:
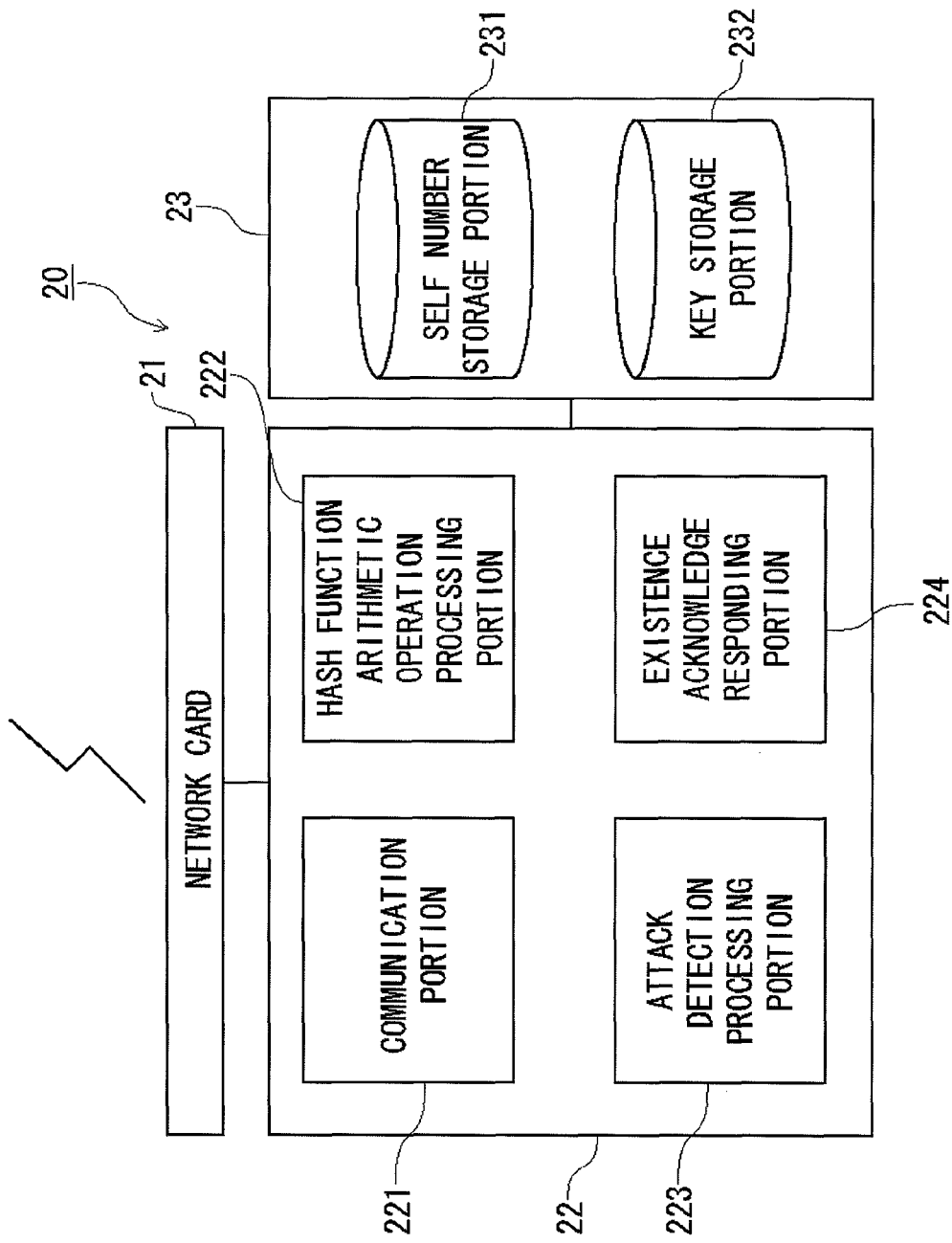
FIG. 11 is a configuration diagram of a wireless communication terminal (second embodiment) of the present invention.

Next, a second embodiment optimal for the resynchronization processing will be described in detail with reference to the accompanying drawings. FIG. 10 is a configuration diagram of an access point in the second embodiment and FIG. 11 is a configuration diagram of the same wireless communication terminal.

As shown in the Figure, the control communication processing portion (113) of the access point includes a timer portion (116) and an existence acknowledgement signal sending portion (117) and the wireless communication terminal (20) includes an existence acknowledgement responding portion (224).

In this configuration, the resynchronization processing at the time of the above-described periodic update processing of the MAC address will be described. Here also, a case where the update instruction signal Update Command is lost before it reaches the wireless communication terminal as shown in FIG. 12 and a case where the acknowledge signal Update Acknowledge is lost without reaching any access point although it has reached the wireless communication terminal will be considered.

Figure 12:
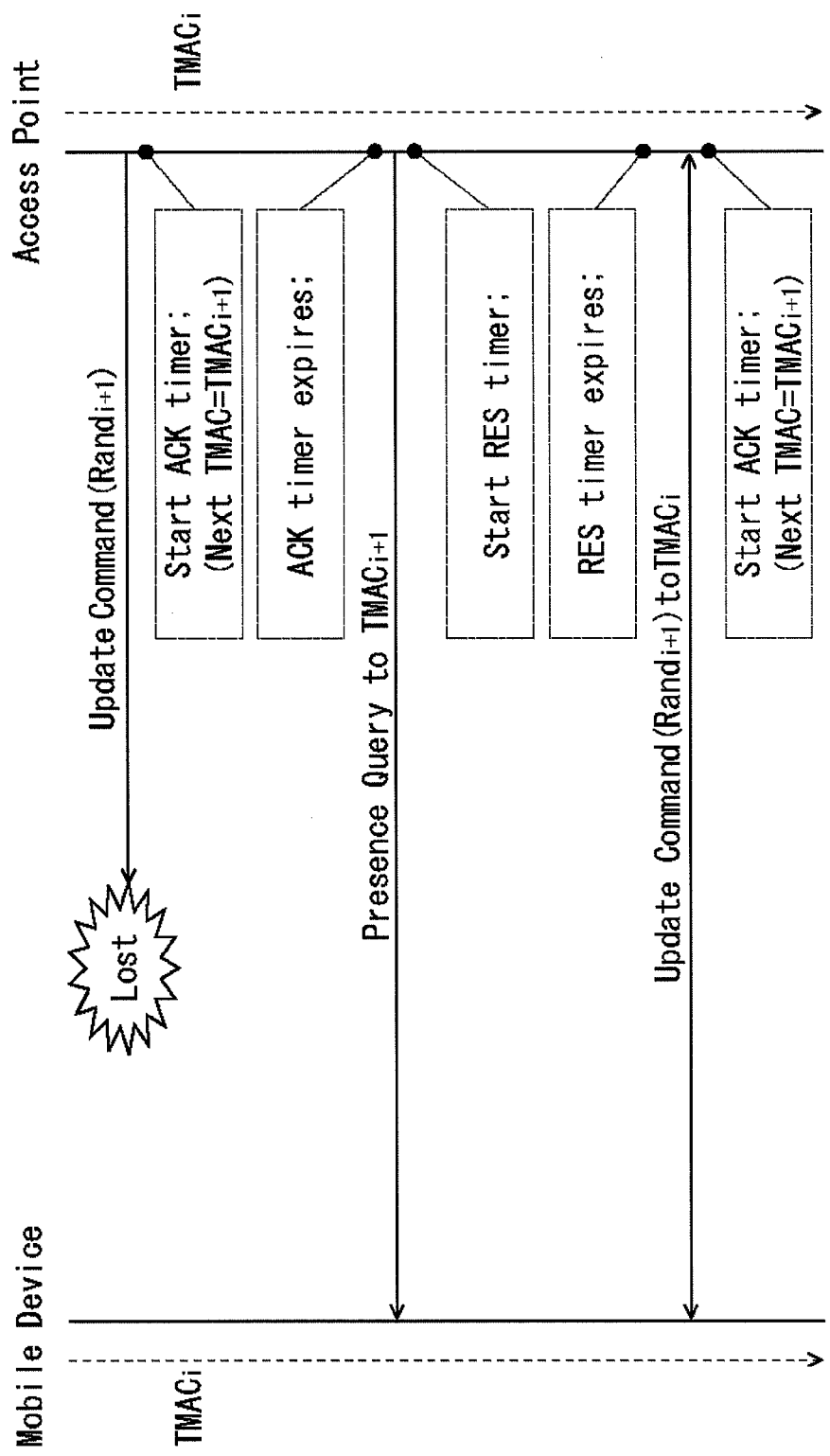
FIG. 12 is a sequence diagram of a case where the update instruction signal is missing halfway in the second embodiment using an existence acknowledge signal.

According to the former case of FIG. 12, at the same time when the update instruction signal Update Command is sent, the timer portion (116) starts (Start ACK timer) counting of time. Although the acknowledge signal is received within a predetermined time period at the time of normal communication, in this case, naturally the acknowledge signal is not returned because the update instruction signal has not reached the wireless communication terminal.

Then, when a predetermined acknowledgement timer time is elapsed (ACK timer expires) when the timer portion (116) counts time, it is notified to the existence acknowledgement signal sending portion (117). The existence acknowledgement signal sending portion (117) sends an existence acknowledgement signal Presence Query to the second MAC address $TMAC_{i+1}$ by referring to the identification number storage portion (121) first.

Although such a processing is premised on that the update instruction signal has reached the wireless communication terminal properly, in reality, no response to the existence acknowledgement signal is returned for the reason that the signal has not reach.

According to this embodiment, the timer portion (116) starts counting of time (Start RES timer) at the same time when the existence acknowledgement signal is sent and when a predetermined existence acknowledgement response timer time is elapsed (RES timer expires), the identification number synchronization control portion (115) can recognize that no update instruction signal has reached for the reason that no response is returned.

Accordingly, like the first embodiment, the quantity of transmissions is increased and as for the random number, the same value $Rand_{i+1}$ as the update instruction signal is sent.

Although a case where the existence acknowledgement signal is lost halfway, the acknowledge timer time is expired like when the update instruction signal has not reached, so that the same processing is carried out after that.

In the meantime, the acknowledgement timer time and the existence acknowledgement response timer time do not need to be of identical time and may be set appropriately.

Figure 13:
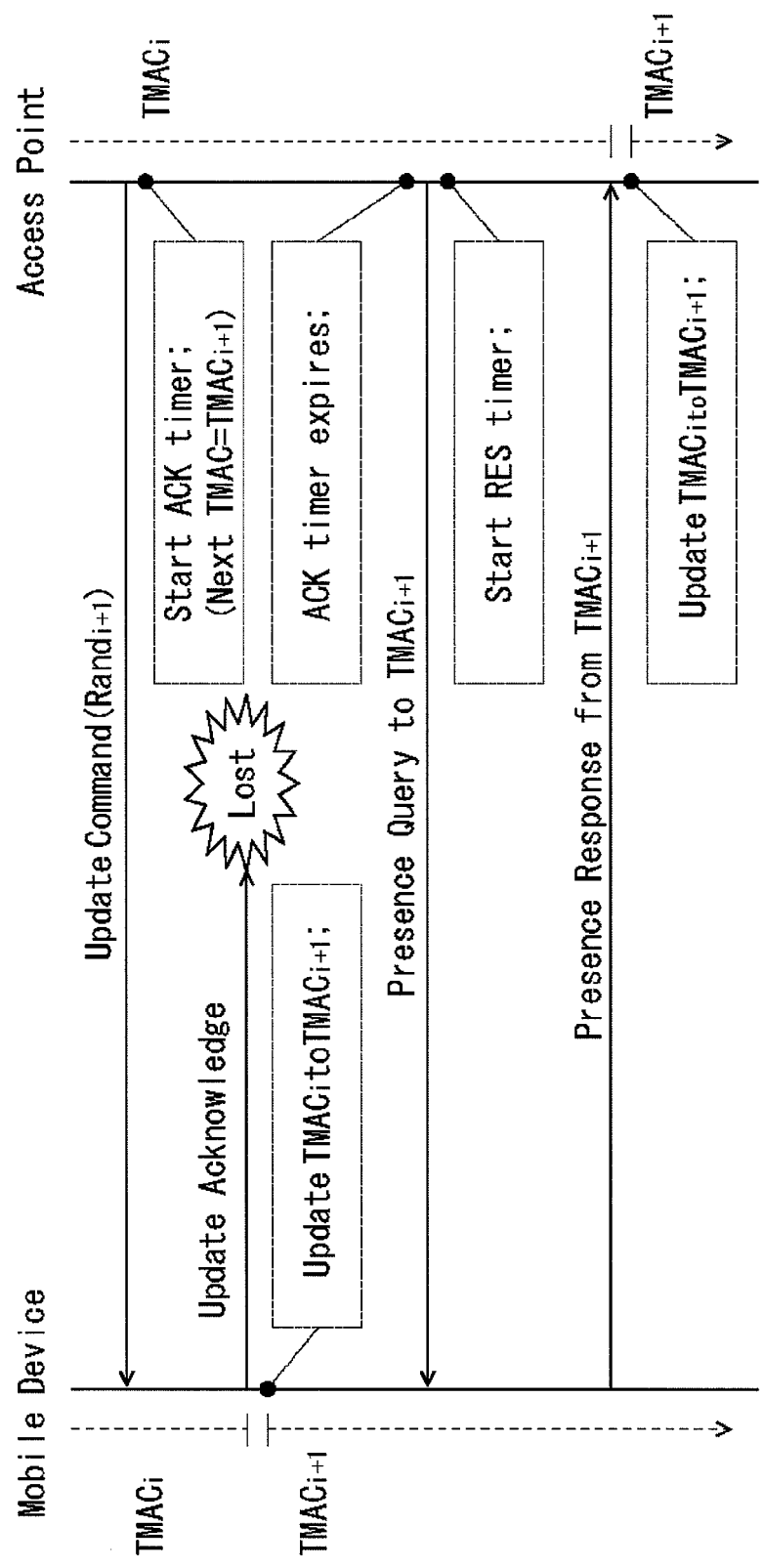
FIG. 13 is a sequence diagram of a case where the acknowledge signal is lost halfway in the second embodiment using the existence acknowledge signal.

Next, the case of FIG. 13, that is, the case where the acknowledge signal Update Acknowledge from the wireless communication terminal is lost halfway will be described.

In this case also, the acknowledgement timer time of the access point is also expired, the existence acknowledgement signal sending portion (117) sends an existence acknowledgement signal. Although this signal is sent to the MAC address $TMAC_{i+1}$, the existence acknowledgement signal reaches properly because the MAC address is changed to the $TMAC_{i+1}$ on the wireless communication terminal end in the case of FIG. 13.

After the wireless communication terminal receives the existence acknowledgement signal, the existence acknowledgement responding portion (224) sends back the existence acknowledgement response (Presence Response) with the $TMAC_{i+1}$ as a sending address. Because the existence acknowledgement response has been received within an existence acknowledgement response timer time, the access point can recognize that the MAC address has been changed to $TMAC_{i+1}$ at the wireless communication terminal. Then, the identification number synchronization control portion (115) executes a processing of changing the MAC address of the wireless communication terminal by the same processing as the access point side identification number periodic update step.

Figure 14:
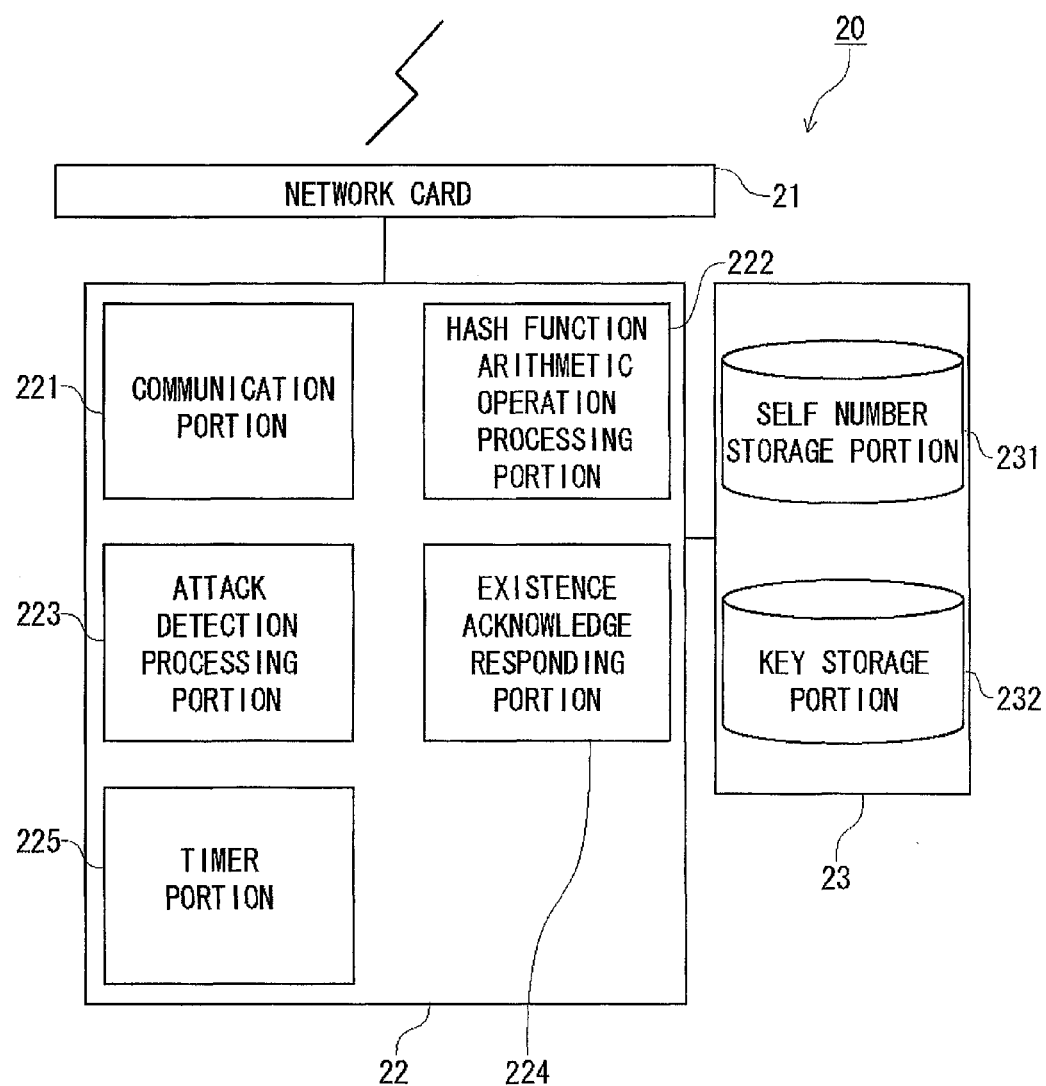
FIG. 14 is a configuration diagram of a wireless communication terminal (third embodiment) of the present invention.

The third embodiment of the present invention shows a configuration in which the wireless communication terminal (20) is equipped with the timer portion (225) as shown in FIG. 14.

Figure 15:
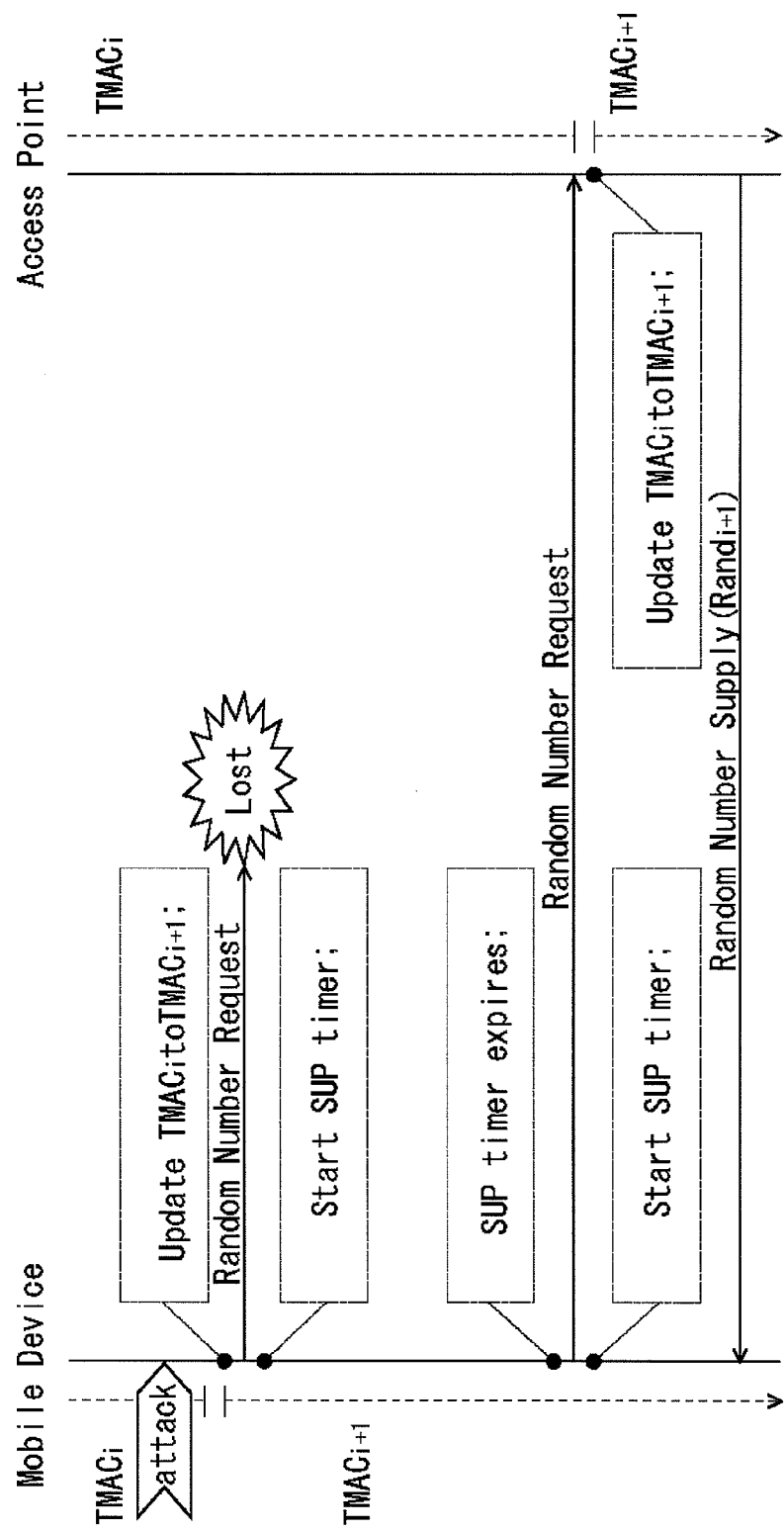
FIG. 15 is a sequence diagram of a case where the attack detection signal is missing halfway.
Figure 16:
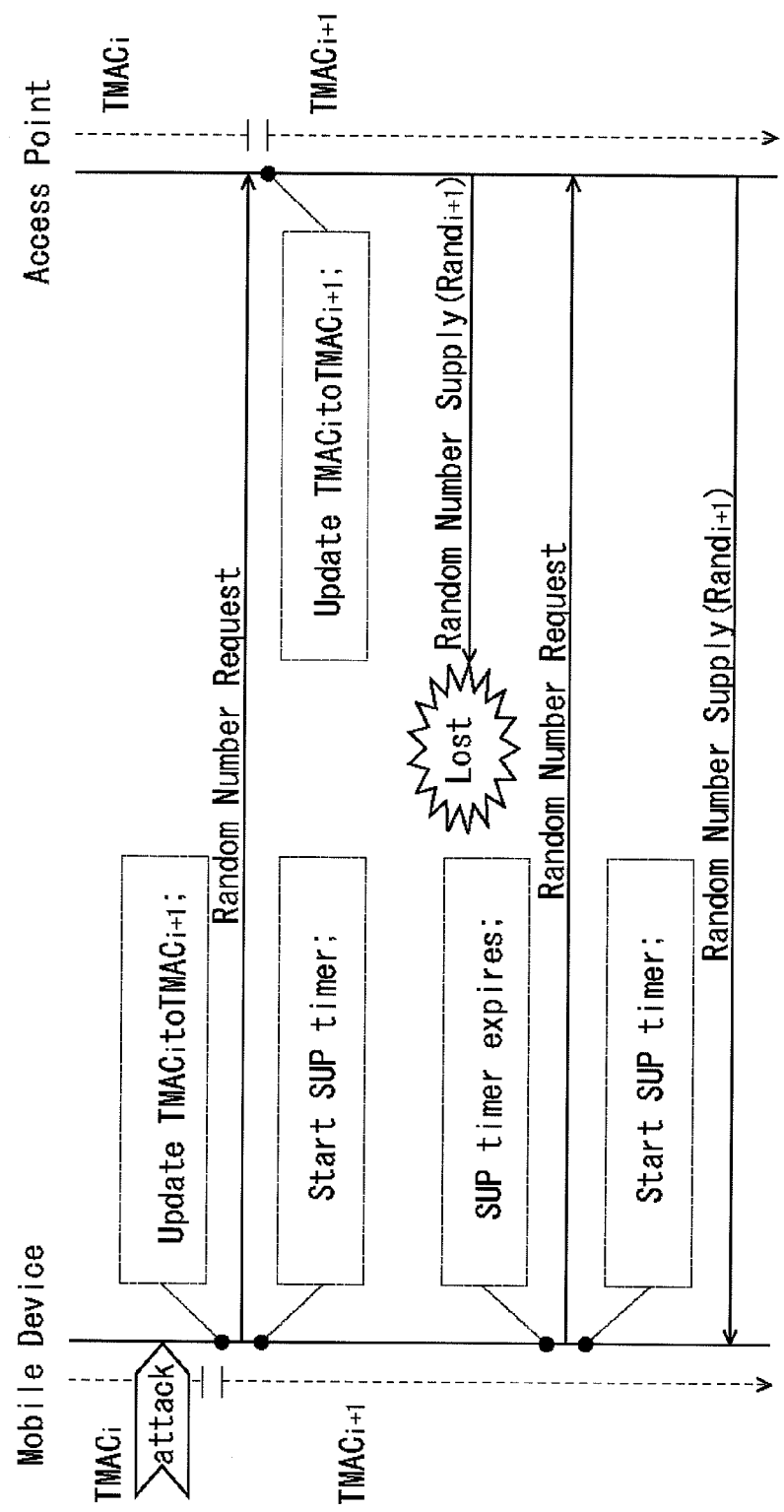
FIG. 16 is a sequence diagram of a case where a random number notification signal is missing halfway.

This timer portion (225) operates when the attack detection signal is lost halfway as shown in FIG. 15 or the random number notification signal is lost halfway as shown in FIG. 16.

In case of FIG. 15, if the attack (attack) occurs to the wireless communication terminal (20), the MAC address of the wireless communication terminal is updated to $TMAC_{i+1}$ by the technology of the present invention, so that as described above, the attack detection signal (Random Number Request) is sent to the access point. At the same time when the signal is sent, the timer portion (225) starts counting of time (Start SUP timer). Although usually, the random number notification signal is returned within the time period, no random number notification signal reaches because no attack detection signal has reached to the access point.

When in counting of time, a predetermined time is elapsed (SUP timer expires), the timer portion (225) instructs to send the attack detection signal from the communication portion (221). A next attack detection signal in the Figure indicates that it has reached an access point, processing such as updating of the MAC address is progressed at the access point.

Next, the case of FIG. 16 will be described.

Because a first attack detection signal has reached the access point in this case, the MAC address has been updated on the access point side and the random number notification signal is sent. Further, because this random number notification signal has been lost, in counting of time at the timer portion (225), a predetermined time is elapsed like the case of FIG. 15.

The timer portion (225) instructs to send an attack detection signal from the communicating portion (221) again and then, a second attack detection signal reaches the access point.

Because the access point can know that the previous random number notification signal has not reached because the second attack detection signal has reached, the random number notification signal sent previously will be notified of.

As described above, resynchronization can be executed effectively after the attack is detected by providing the wireless communication terminal with a timer portion.

Figure 17:
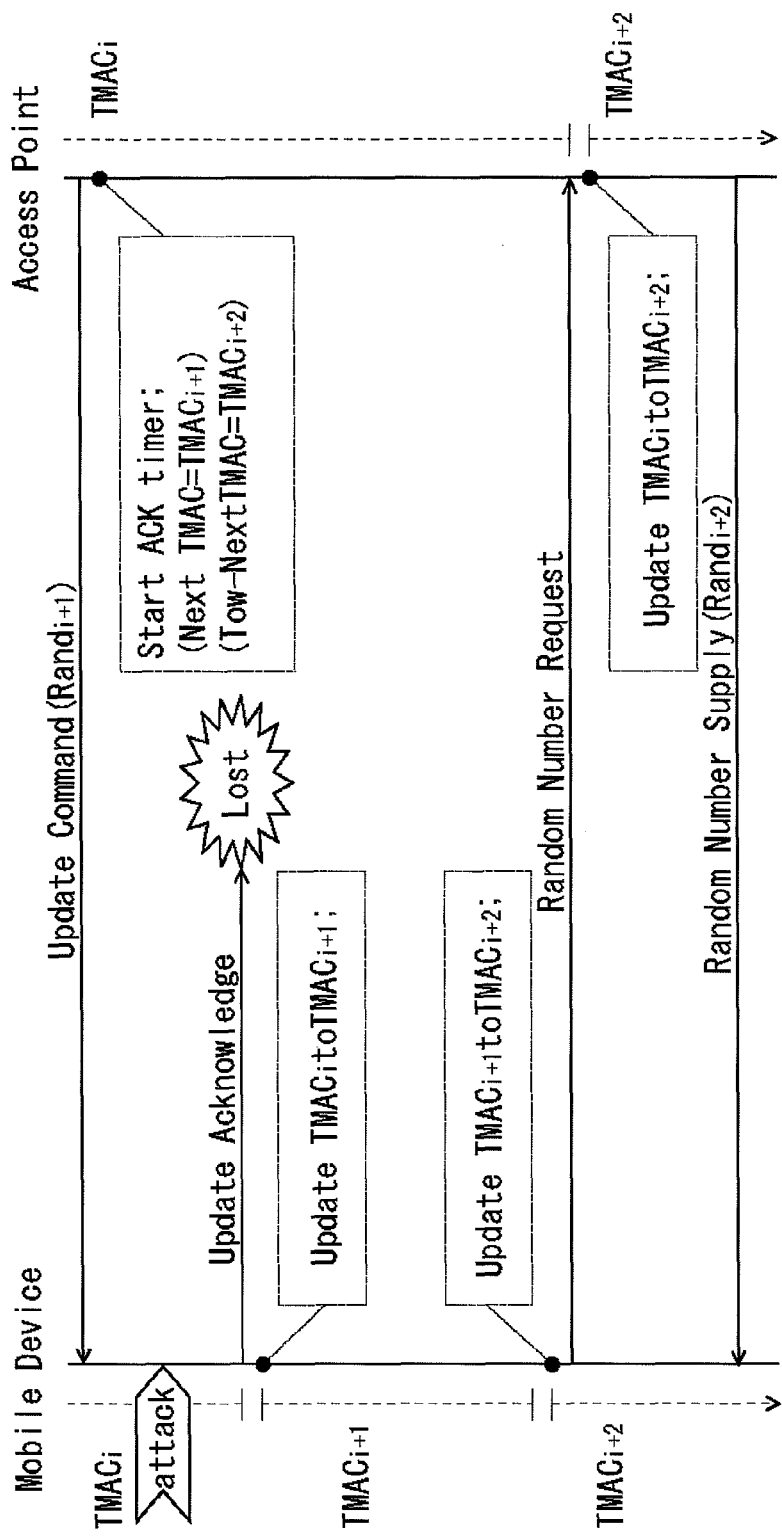
FIG. 17 is a sequence diagram of a case where the acknowledge signal is missing halfway while the attack is received.

Finally, FIG. 17 is a sequence diagram for resynchronization processing in configuration for storing a current MAC address $TMAC_i$ before updating, a current MAC address $TMAC_{i+1}$ after updating and a next MAC address $TMAC_{i+2}$ after the updating in the identification number storage portion (121) of the access point of the present invention.

The same figure indicates that an acknowledge signal to the update instruction signal (Update Command) for the periodic update is lost halfway and an attack occurs within time counting interval of the acknowledge signal at the time portion (116) of the access point.

The MAC address on the wireless communication terminal side is updated to $TMAC_{i+1}$ by a first update instruction signal. Further, it is updated to $TMAC_{i+2}$ by detecting the attack. The $TMAC_{i+2}$ has been calculated using a random number notified of by the update instruction signal.

Because the acknowledge signal has not reached yet at the access point side, the $TMAC_i$ of the wireless communication terminal is still kept.

According to the present invention, Because all the MAC addresses, that is, $TMAC_i$, $TMAC_{i+1}$ and $TMAC_{i+2}$ are possessed after an instruction for updating the $TMAC_{i+1}$ has been dispatched, when the attack detection signal from the wireless communication terminal (20) is sent from an address of the $TMAC_{i+2}$, it can be received. Then, by an operation of the identification number synchronization control portion (115), the current MAC address in the identification number storage portion (121) can be updated to $TMAC_{i+2}$ and a random number for calculating a next MAC address can be sent out.

By possessing three addresses, resynchronization of the MAC address can be carried out securely even if an attack occurs during the updating.

In the fourth embodiment of the present invention, a following processing may be carried out using the access point and wireless communication terminal shown in FIG. 10 and FIG. 11.

Figure 18:
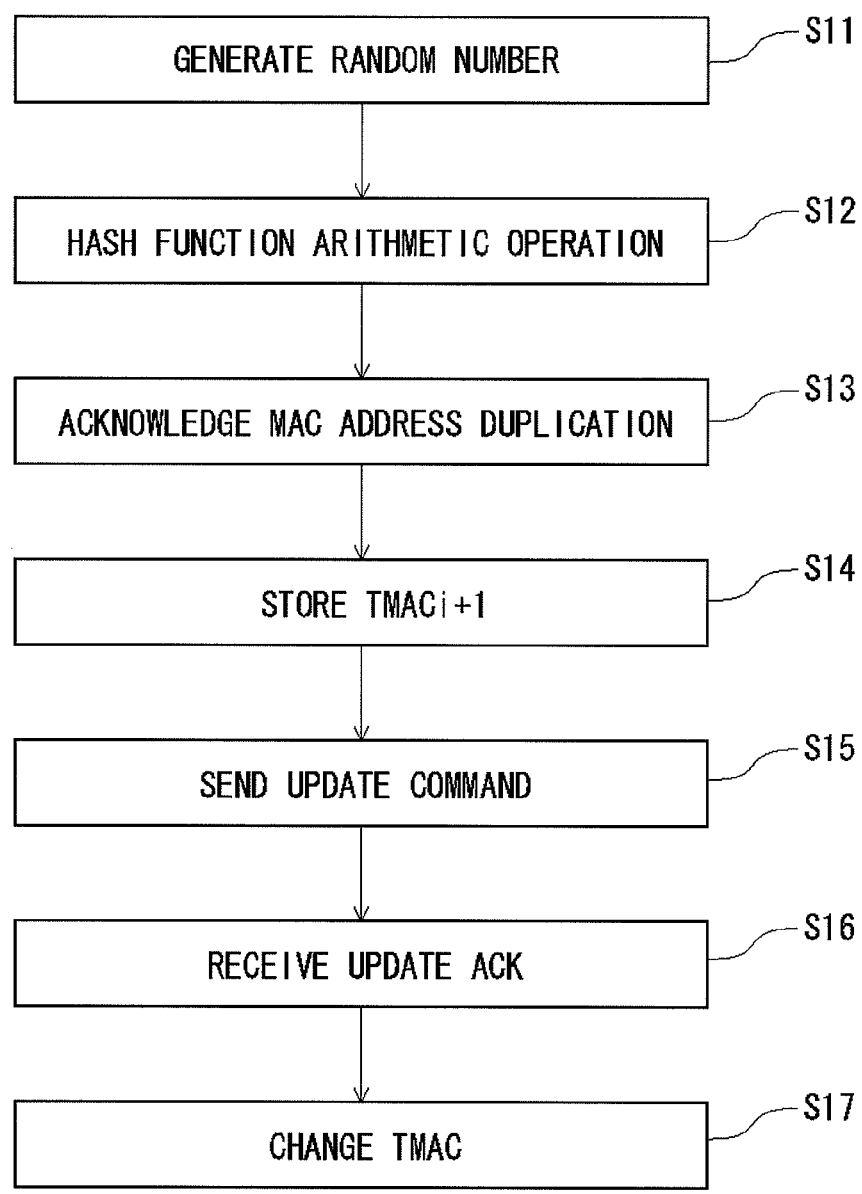
FIG. 18 is a flow chart of processing at an access point of the fourth embodiment.

First, the update instruction signal will be described. When the update instruction signal of the present embodiment is received, the random number generation processing portion (111) generates a random number $Rand_i$ as shown in FIG. 18. (S11). Here, a single i is generated corresponding to a MAC address of the current wireless communication terminal (111).

Next, the hash function arithmetic operation processing portion (112) calculates a second new MAC address $TMAC_{i+1}$ using a hash function shown in equation 1 using the generated random number $Rand_i$ (S12). Duplication check (S13) is carried out for the calculated MAC address by the hash function arithmetic operation processing portion to see whether or not any duplicated MAC address exists in the local area. Because at this time, two new/old identification numbers can be stored for each wireless communication terminal in the identification number storage portion (121) as described later, whether or not it is a duplication of the new/old identification numbers is confirmed in such a configuration.

If such a duplicated MAC address exists, the procedure is returned to the random number generation step (S11) and the processing of S12 and S13 is carried out again. Consequently, the characteristic property of the MAC address in the local area is secured.

When there is no problem in the duplication check (S13), the control communication processing portion stores the $TMAC_{i+1}$ in the identification number storage portion (121) as a next MAC address of the wireless communication terminal (S14). Consequently, the access point side identification number generation step of S11 to S14 is terminated.

As an update instruction step, the control communication processing portion (113) sends an update instruction signal Update Command (Rand) to the wireless communication terminal (S15).

Figure 19:
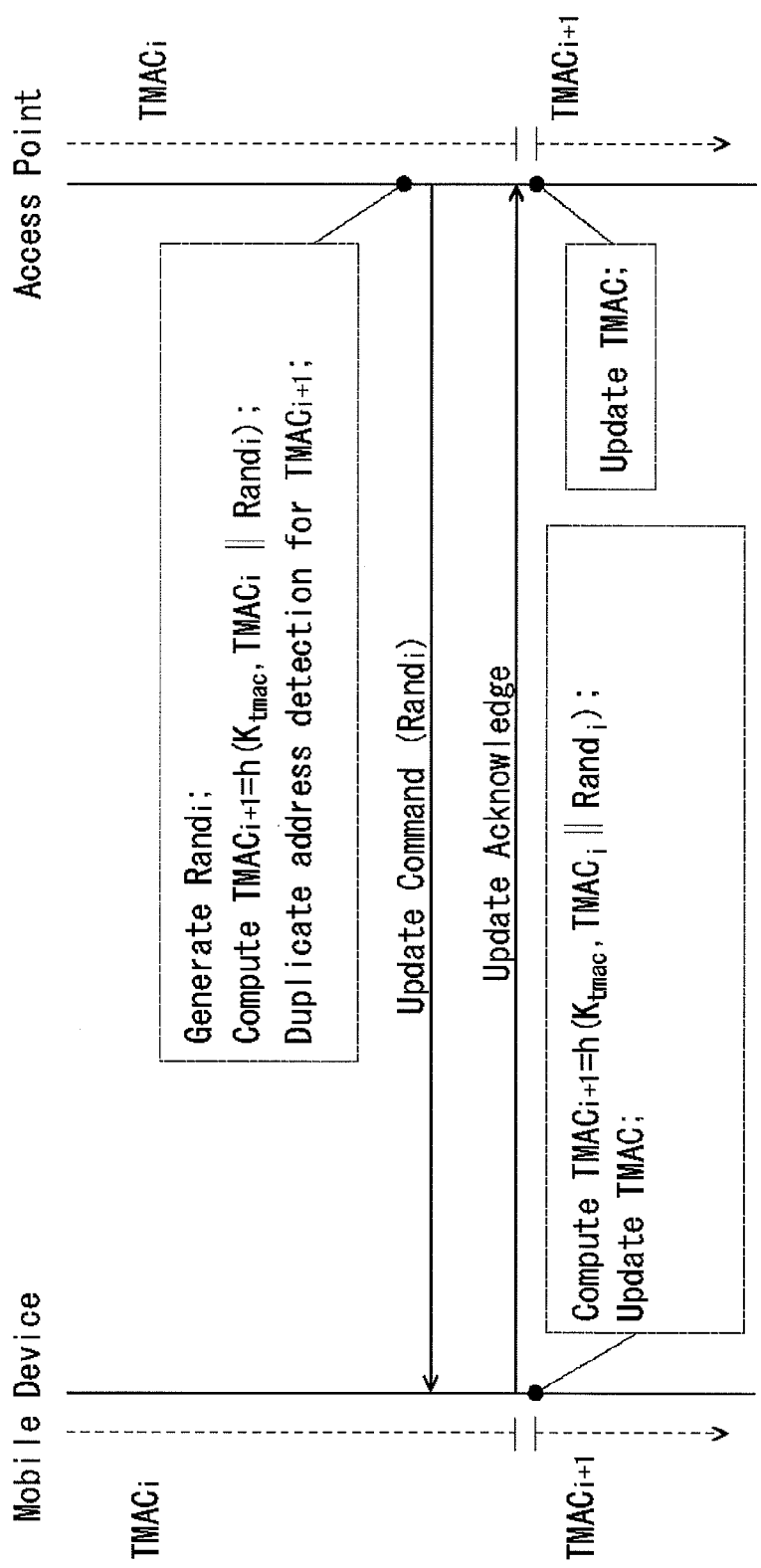
FIG. 19 is a sequence diagram of the update instruction signal of the fourth embodiment.

FIG. 19 shows a sequence diagram of a signal concerning the update instruction. In FIG. 19, a dotted line on the left end indicates how the wireless communication terminal (Mobile Device) recognizes its own MAC address and a dotted line on the right end indicates how the access point (Access Point) recognizes the MAC address of the wireless communication terminal.

The update instruction signal contains a random number $Rand_i$ and the destination at this time is $TMAC_i$ which is a current MAC address.

Usually, the acknowledge signal Update Acknowledge is returned from the wireless communication terminal which receives the update instruction signal by means of the communicating portion (221) and received (S16).

Because when the MAC address is updated at the wireless communication terminal, it can be determined, the access point which receives the acknowledge signal carries out a processing (S17) of changing a current MAC address stored in the identification number storage portion (121) to a second MAC address calculated above by an operation of the control communication processing portion (113), so that the second MAC address turns to an empty data. This processing is access point side identification number update step.

At the same time, the wireless communication terminal sends an acknowledge signal and the hash function arithmetic operation processing portion (222) executes the same arithmetic operation as at the above-mentioned access point so as to calculate the MAC address $TMAC_{i+1}$ to be changed using a random number received by the update instruction signal. This is terminal side identification number generation step.

Subsequently, as the terminal side identification number update step, a current MAC address stored in the self number storage portion (231) is updated to $TMAC_{i+1}$ and after that, it behaves as a wireless communication terminal of the $TMAC_{i+1}$.

Although the update of the MAC address can be carried out at an optional timing, as an embodiment, it is preferable to execute the processing of S1 to S7 periodically, for example, every 10 seconds. In that case, a next update time, update interval and sequence number (transmission counts) are recorded in the memory means of the access point for each wireless communication terminal.

Figure 20:
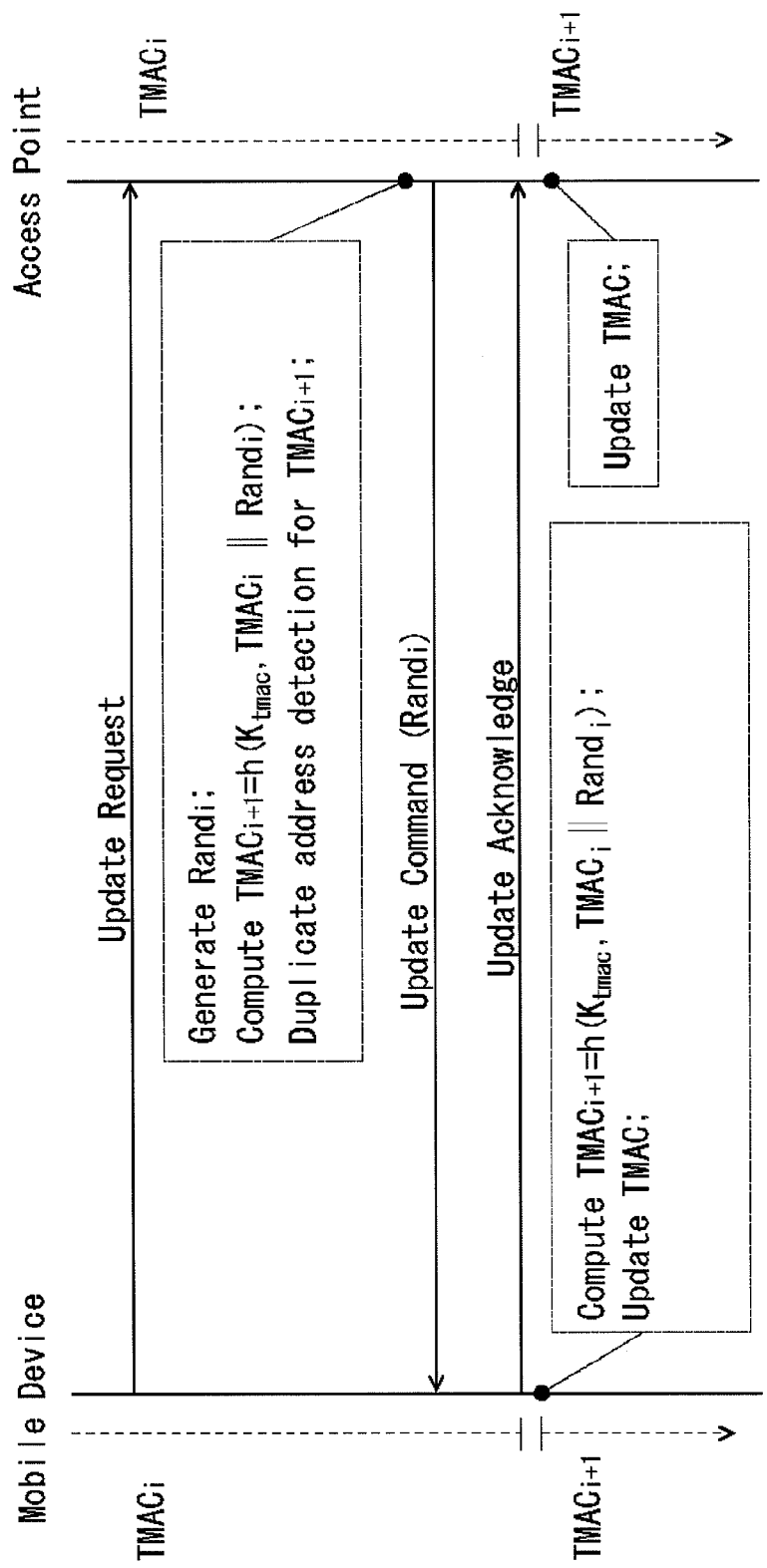
FIG. 20 is a sequence diagram of update instruction request of the fourth embodiment.

The wireless communication system of the present invention can execute urgent MAC address change processing in order to protect effectively from the DoS attack. Next, the urgent update processing will be described. FIG. 20 is a sequence diagram of the urgent update processing.

The wireless communication terminal is provided with the attack detection processing portion (223) and when illegal frames are received more than a specified amount, it is detected that the DoS attack is received. This is processing of the DoS attack detection step in the wireless communication method.

In this embodiment, when clearly illegal frames or frames containing no message authentication code are received more than a specified time, for example, 10 frames or more every second, the attack is detected.

According to an instruction from the attack detection processing portion (223), the communicating portion (221) sends an update instruction request Update Request (update instruction request step) to the access point (10). Corresponding to the update instruction request, the control communication processing portion (113) of the access point controls to execute the processing from the S11.

The flow of the access point and wireless communication terminal based on the update instruction signal and update instruction request/acknowledge signal has been described above. If each signal reaches the other end as shown in FIG. 19 and FIG. 20, the MAC address is updated smoothly by the above-described processing. However, it has been known that a delay or missing occurs in any frame of wireless communication so as to disable proper communication by a normal method.

The feature of the present application is that proper synchronization is obtained even if each signal does not reach.

First, resynchronization processing at the time of periodic update processing of the MAC address will be described. A case where the update instruction signal Update Command is lost before it reaches the wireless communication terminal as shown in FIG. 21 and a case where the acknowledge signal Update Acknowledge is lost without reaching the access point although it has reached the wireless communication terminal as shown in FIG. 22 can be considered.

Figure 21:
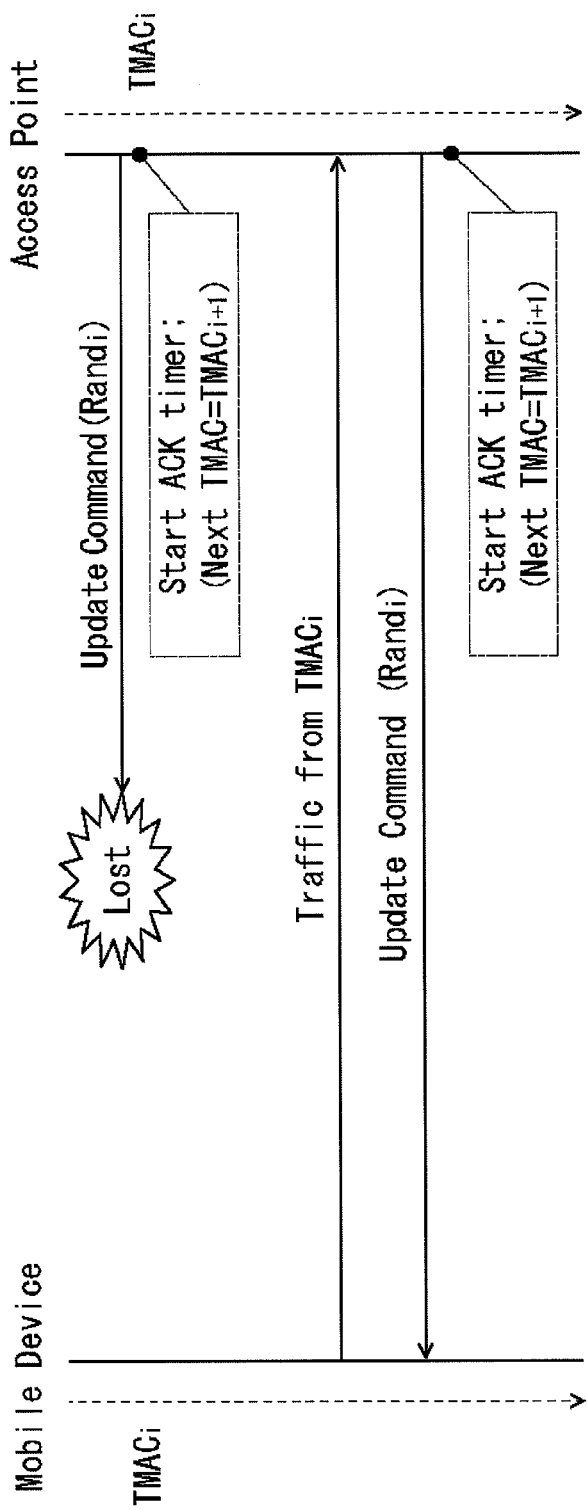
FIG. 21 is a sequence diagram of a case where the update instruction signal is missing halfway of the fourth embodiment.
Figure 22:
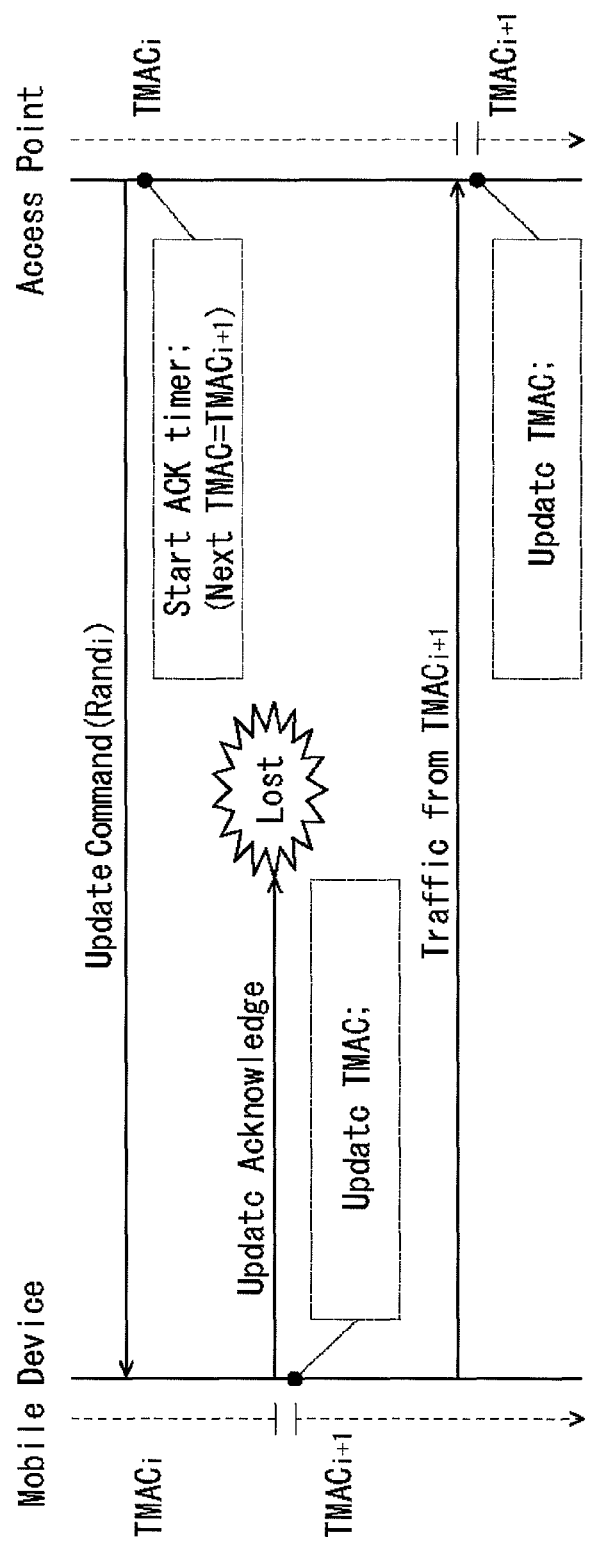
FIG. 22 is a sequence diagram of a case where the acknowledge signal is missing halfway of the fourth embodiment.

If considering the case of FIG. 21, the access point has not updated the MAC address from the $TMAC_i$ until the acknowledge signal is received from the wireless communication terminal after the update instruction signal is sent. Thus, even if any communication (traffic) is received from the wireless communication terminal, this can be received normally.

The control communication processing portion (113) is provided with the detecting portion (114) and the detecting portion (114) detects from which MAC address, new or old one, the signal is received (detection step).

If it is detected that it is received from the old address in case of FIG. 21, the identification number synchronization control portion (115) of the access point can recognize that the update instruction signal has not reached normally and in that case, the transmission count is increased or as for the random number, the same value as the previous update instruction signal is sent. This is the same as processing after S15 in FIG. 18.

On the other hand, if considering the case of FIG. 22, the update instruction signal reaches the wireless communication terminal and thus, the MAC address is changed on the wireless communication terminal side. However, the MAC address is not updated from the $TMAC_i$ on the access point side because the acknowledge signal does not reach the access point.

In this case also, if any communication from the wireless communication terminal is received, the detecting portion (114) of the control communication processing portion can recognize that this communication is a communication from the wireless communication terminal by referring to the $TMAC_{i+1}$ stored in the identification number storage portion (121) in S14 of FIG. 18.

Further, the identification number synchronization control portion (115) can recognize by the reaching of this communication, that the previous update instruction signal has reached and no acknowledge signal has reached. Then, the identification number synchronization control portion (115) executes a processing (S17) of changing the MAC address of the wireless communication terminal by the same processing as that performed in S16.

In the above two cases, because both the new and old MAC addresses are stored in the identification number storage portion (121), the detecting portion (114) and the identification number synchronization control portion (115) can execute resynchronization of an accurate MAC address.

Next, the resynchronization processing at the time of urgent update processing will be described.

Figure 23:
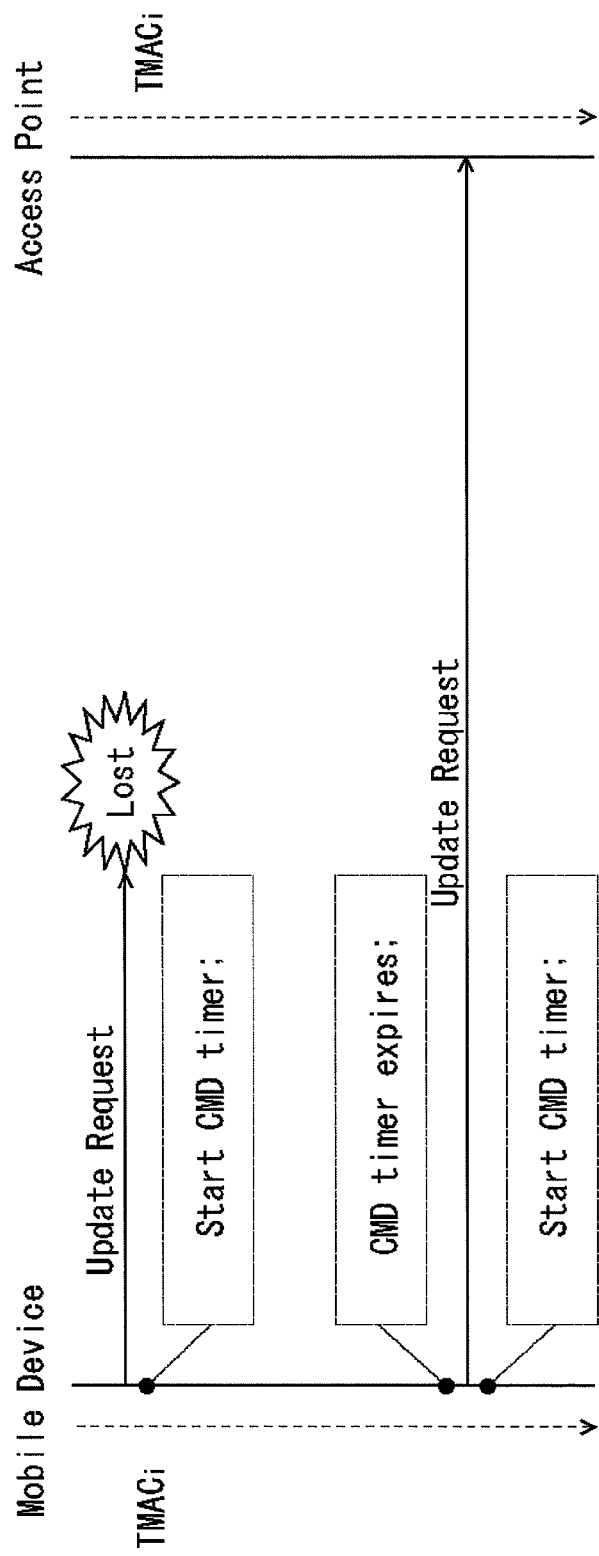
FIG. 23 is a sequence diagram of a case where the update instruction request is missing halfway of the fourth embodiment.

It is estimated that when the update instruction request Update Request is sent from the wireless communication terminal (20), the update instruction request is lost halfway as shown in FIG. 23. Because in this example, the access point (10) cannot know that the update instruction request has been sent, this needs to be solved on the wireless communication terminal side.

The wireless communication terminal (20) is equipped with a timer portion (not shown) and at the same time when the update instruction request is sent, counting of time is started and unless the update instruction signal from the access point is received within a predetermined time period, the number of transmissions of the update instruction requests from the communicating portion (221) is increased by one and the update instruction request is sent again.

Figure 24:
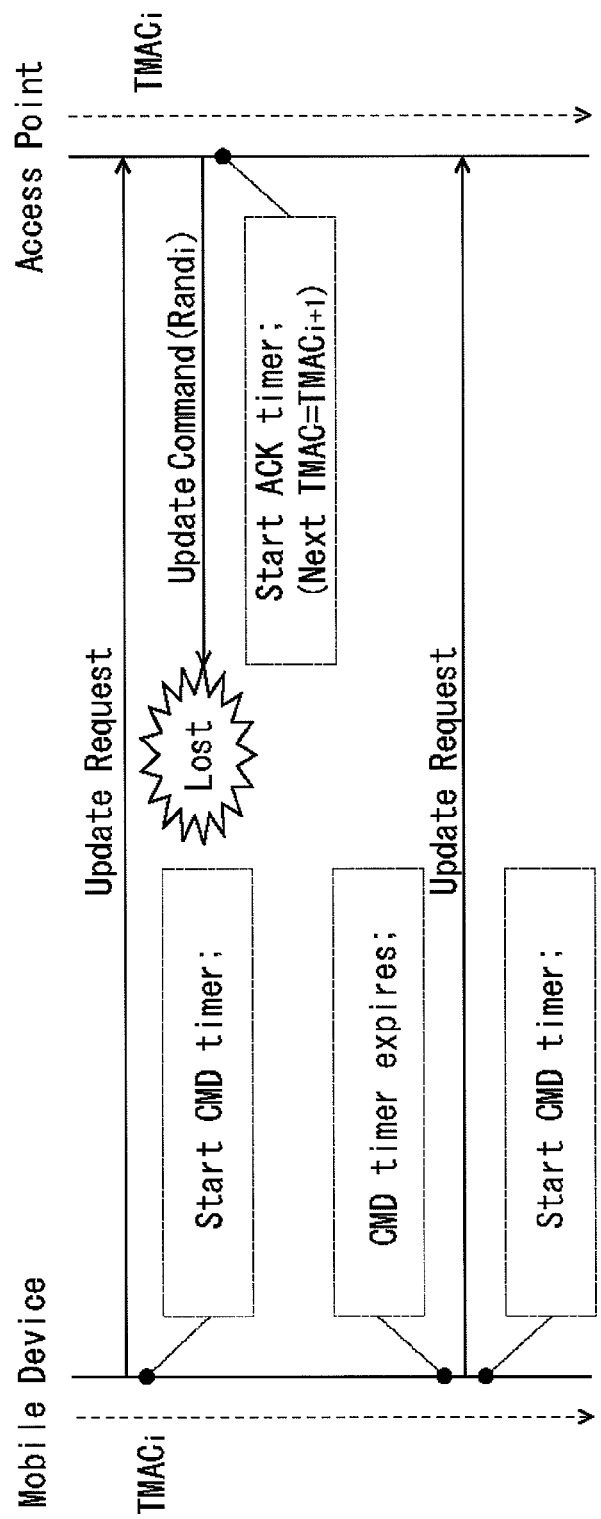
FIG. 24 is a sequence diagram of a case where an update instruction signal to an update instruction request is missing halfway of the fourth embodiment.

FIG. 24 shows a case where the update instruction signal from the access point is lost halfway although the update instruction request from the wireless communication terminal has reached.

Although resynchronization processing on the access point side is carried out as described above, if a predetermined time is elapsed in counting of time by the timer portion of the wireless communication terminal, the number of transmissions of the update instruction requests from the communicating portion (221) is increased by one and at the same time, the update instruction request may be sent again.

Figure 25:
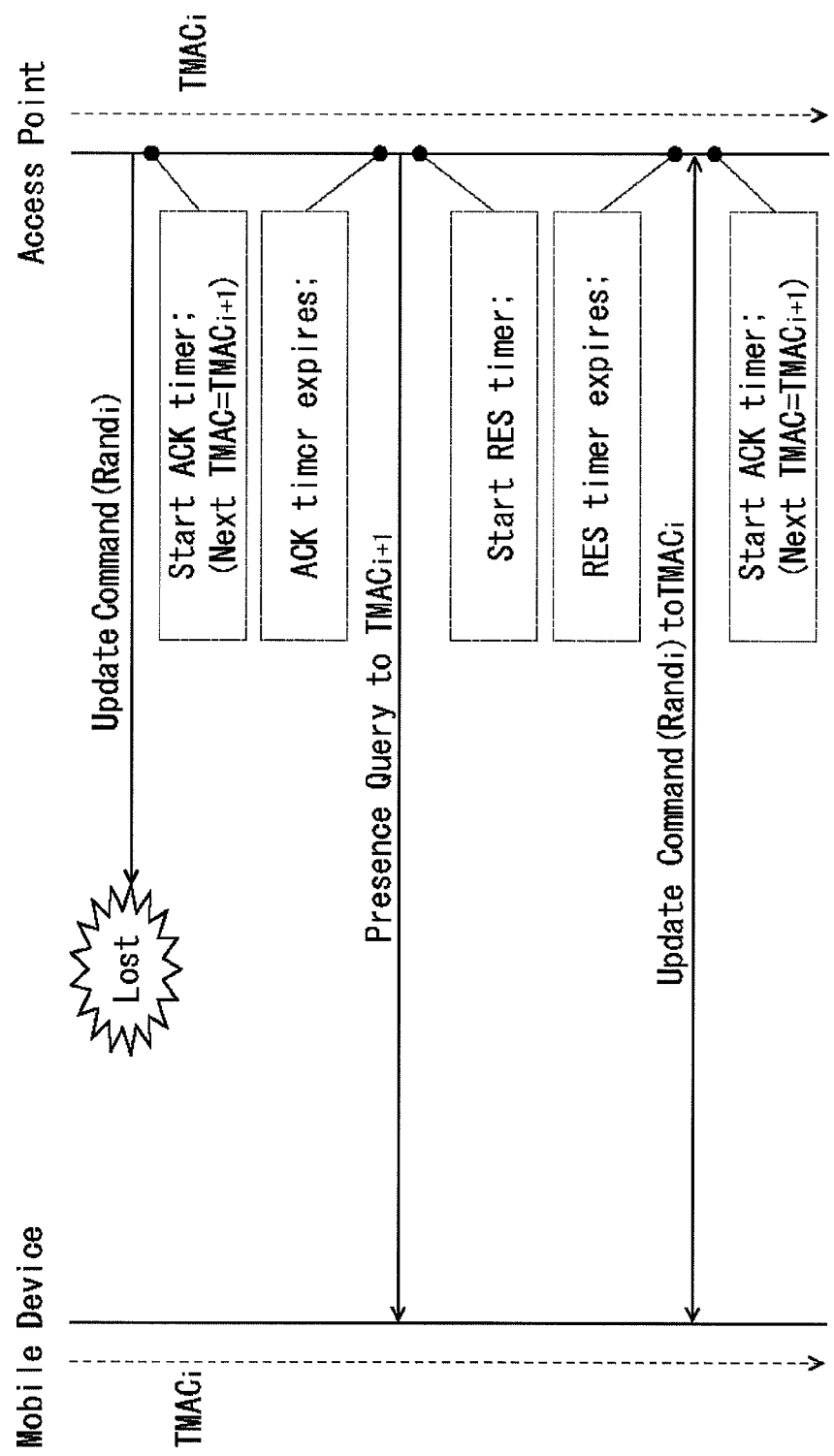
FIG. 25 is a sequence diagram of a case where the update instruction signal is missing halfway when the existence acknowledge signal is used of the fourth embodiment.
Figure 26:
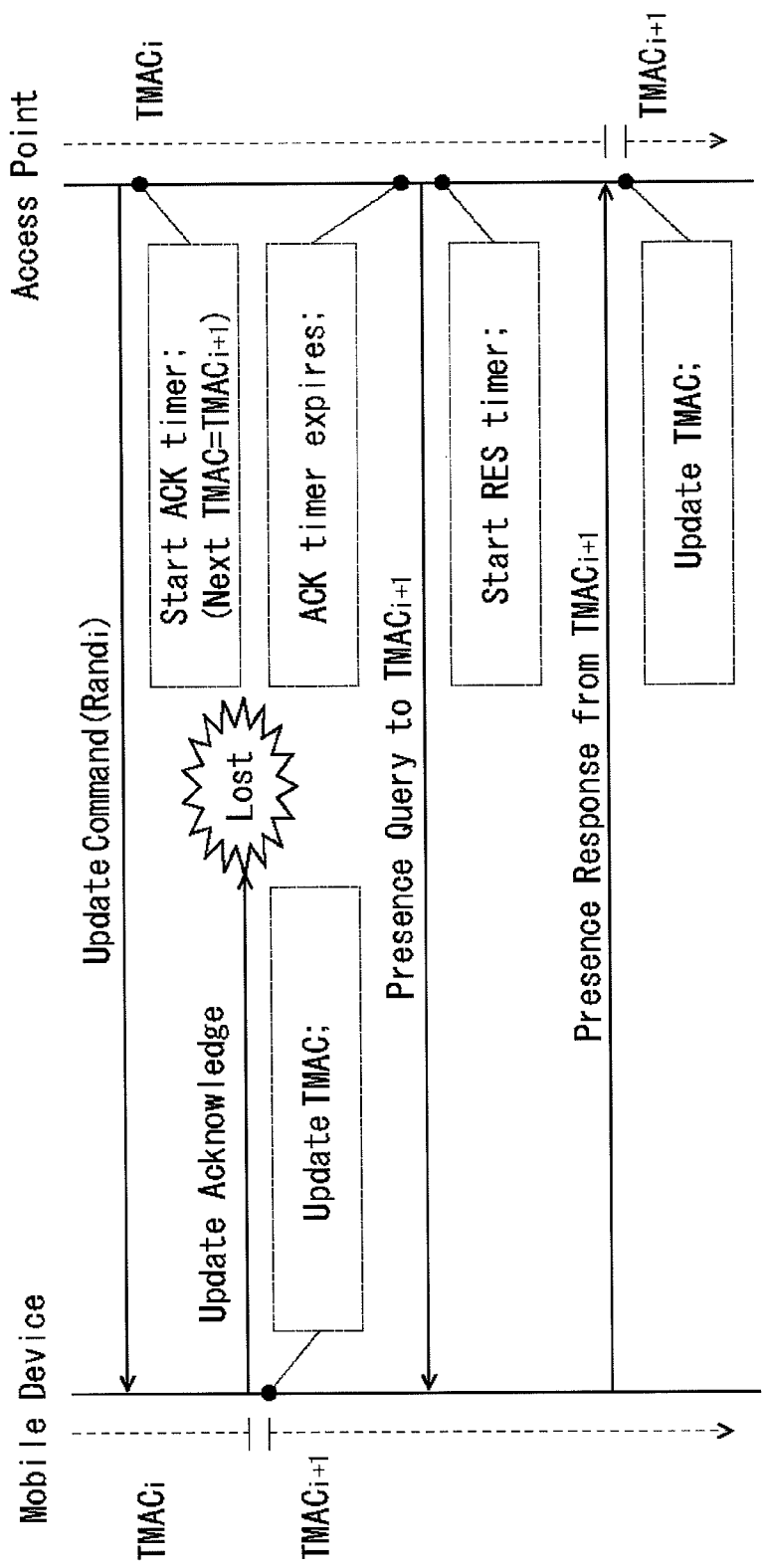
FIG. 26 is a sequence diagram of a case where the acknowledge signal is missing halfway when the existence acknowledge signal is used, of the fourth embodiment.

Next, the resynchronization processing will be described. A case where the update instruction signal Update Command is lost before it reaches the wireless communication terminal as shown in FIG. 25 and a case where the acknowledge signal Update Acknowledge is lost without reaching any access point although it has reached the wireless communication terminal as shown in FIG. 26 is considered.

First, in the case of FIG. 15, the update instruction signal Update Command is sent and at the same time, the timer portion (116) starts counting of time. Although the acknowledge signal is received within a predetermined time interval at the time of normal communication, naturally, the acknowledge signal is not sent back because the update instruction signal has not reached the wireless communication terminal in this example.

Then, if a predetermined acknowledgement timer time is elapsed (ACK timer expires) in counting of time by the timer portion (116), it is reported to the existence acknowledgement signal sending portion (117). The existence acknowledgement signal sending portion (117) sends the existence acknowledgement signal Presence Query to the second MAC address $TMAC_{i+1}$ by referring to the identification number storage portion (121).

Although this processing is premised on that the update instruction signal has reached the wireless communication terminal normally, no response is sent back to the existence acknowledge signal because it has not reached actually.

According to the present embodiment, the timer portion (116) starts counting of time at the same time when the existence acknowledge signal is sent, and when a predetermined existence acknowledge response timer time is elapsed (RES timer expires), the identification number synchronization control portion (115) can recognize that the update instruction signal has not reached because no response is sent back.

Therefore, the number of transmissions is increased and as for the random number, the same value as the previous update instruction signal is sent. This is the same as processings after S15 of FIG. 18.

A case where the existence acknowledge signal is lost halfway is estimated and in this case, the acknowledgement timer time is expired like when the update instruction signal has not reached and a subsequent procedure is carried out in the same way.

In the meantime, the acknowledgement timer time and the existence acknowledge response timer time do not need to be of the same time and they may be set up appropriately.

Next, the case of FIG. 26, that is, a case where the acknowledge signal from the wireless communication terminal is lost halfway will be described.

In this case also, the acknowledge timer time of the access point is expired and thus, the existence acknowledge signal sending portion (117) sends the existence acknowledge signal. Although this signal is sent to the MAC address $TMAC_{i+1}$, in the case of FIG. 26, the existence acknowledgement signal reaches normally because the MAC address is changed to the $TMAC_{i+1}$ on the wireless communication terminal side.

In the wireless communication terminal after receiving the existence acknowledge signal, the existence acknowledge responding portion (224) sends back the existence acknowledge response (Presence Response) as a sending address. The access point can recognize that the MAC address has been changed to $TMAC_{i+1}$ at the wireless communication terminal for the reason that the existence acknowledge response can be received within an existence acknowledge response timer time. Then, the identification number synchronization control portion (115) executes a processing (S7) of changing the MAC address of the wireless communication terminal by the same processing as that performed in S16 of FIG. 18.

To testify the effect of the present invention, a simulation of the wireless communication system of sending a single wireless communication frame every 100 ms from the wireless communication terminal was carried out. Here, system of the above-mentioned embodiment 1 was used. A single wireless communication terminal is selected from the MAC addresses collected by eavesdropping by an attacker and an attack frame is sent every 0.1 ms. The sending is interrupted in 100 ms after the attack.

This 100 ms is set by estimating a time for the attacker to collect the MAC address and simulates a situation in which the attacker repeats collection of the MAC address and attack.

Figure 27:
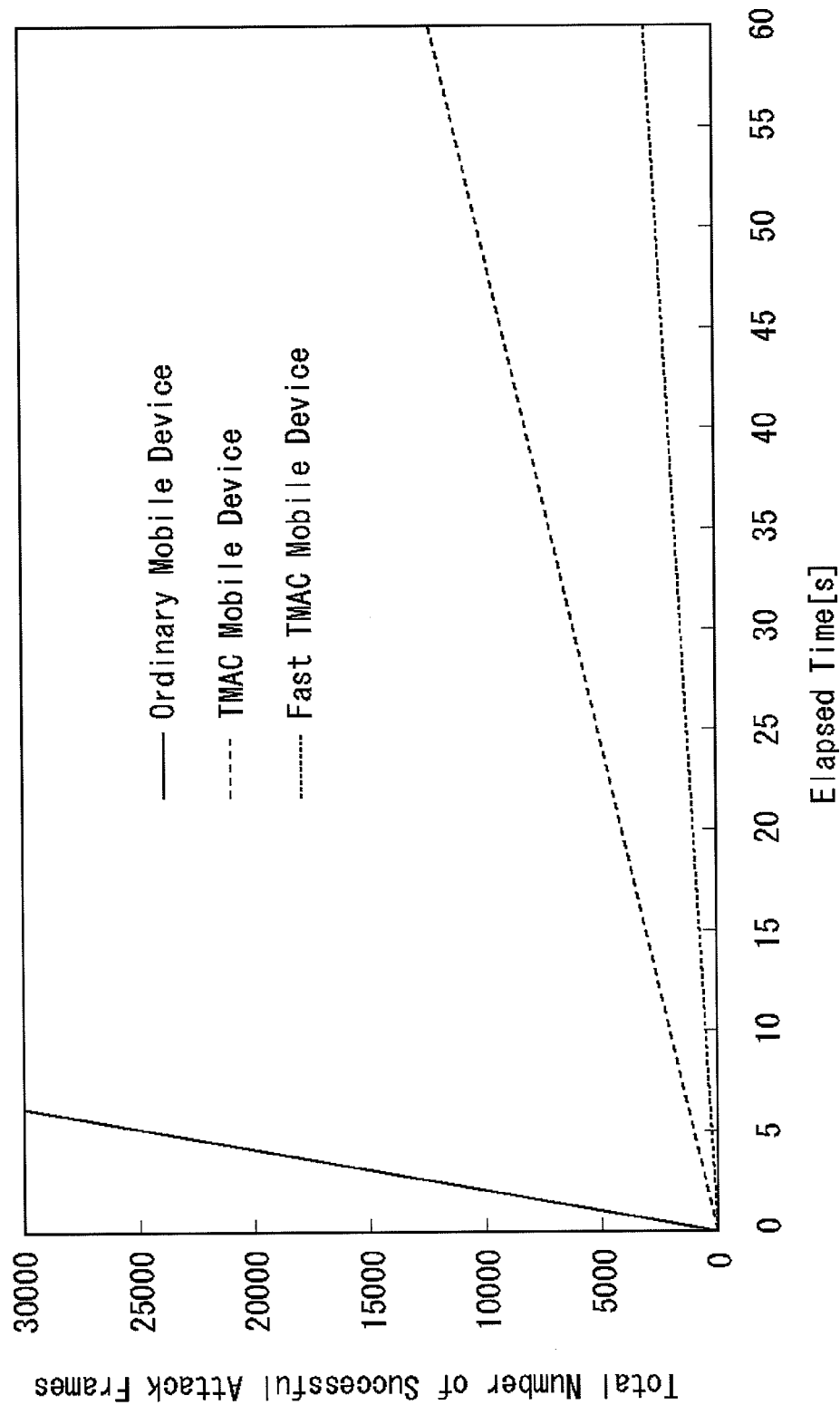
FIG. 27 is a graph showing a result of simulation of DoS attack to the wireless communication terminal of the present invention and the related art.

FIG. 27 is a graph indicating regular wireless communication system not equipped with the present invention (solid line), a wireless communication system for making an update request to an access point after an attack, disclosed in the non-patent document 4 (long dash line) and the quantity of frames in which attack is successful in the wireless communication system of the present invention (short dash line).

According to a result of this simulation, it has been indicated that the quantity of successes of the attack can be reduced to about ¼ remarkably for a conventional system against the technology of the non-patent document 4.

The invention claimed is:

1. A wireless communication system constituted of a singular or plural wireless communication terminals and at least a corresponding access point, wherein
the access point comprises at least
an identification number storage portion which stores a current and next identification number inherent of the wireless communication terminal;
a key storage portion for storing a hash key shared between the wireless communication terminals;
a random number generation processing portion for generating a random number;
a hash function arithmetic operation processing portion for carrying out arithmetic operation processing with a key provided hash function; and
a control communication processing portion which carries out communication with the wireless communication terminal and executes a control processing for each processing portion,
the access point generates a second identification number using a current identification number, a hash key and a first random number for any wireless communication terminal under a control of the control communication processing portion by means of the hash function arithmetic operation processing portion, and further generates a third identification number using the second identification number, hash key and second random number,
the control communication processing portion sends an initialization instruction signal containing the first and second random numbers to the wireless communication terminal, updates a current identification number stored in the identification number storage portion to a second identification number and sets up a next identification number on a third identification number,
the wireless communication terminal comprises at least a communicating portion which communicates with the access point;
a self number storage portion which stores a current and next identification numbers inherent of self;
a key storage portion which stores a hash key shared between the access points; and
the hash function arithmetic operation processing portion which executes arithmetic operation processing with a key provided hash function,
when the communicating portion receives the initialization instruction signal from the access point, the hash function arithmetic operation processing portion generates a second identification number using the current identification number stored in the self number storage portion, hash key and the first random number further, generates a third identification number using the second identification number, hash key and the second random number, updates the current identification number stored in the self number storage portion to a second identification number and sets up a next identification number on a third identification number.

2. The wireless communication system according to claim 1, wherein the control communication processing portion of the access point, after receiving the initialization instruction signal at least once or more, sends the update instruction signal to the wireless communication terminal by a predetermined cycle,
the hash function arithmetic operation processing portion generates a fourth identification number using a next identification number, hash key and third random number for any wireless communication terminal under a control of the control communication processing portion,
the control communication processing portion sends an update instruction signal containing the third random number to the wireless communication terminal, updates a current identification number stored in the identification number storage portion to a next identification number and further updates the next identification number to the fourth identification number,
when the communicating portion of the wireless communication terminal receives the update instruction signal from the access point, the hash function arithmetic operation processing portion generates the fourth identification number using the next identification number stored in the self number storage portion, the hash key and the third random number, updates the current identification number stored in the self number storage portion to the next identification number and further updates the next identification number to the fourth identification number.

3. The wireless communication system according to claim 1 or 2 wherein the wireless communication terminal comprises an attack detection processing portion for detecting Denial of Service (DoS) attack by measuring the amount of communication per unit time, updates a current identification number stored in the self number storage portion to a next identification number when the attack is detected, and the communicating portion sends an attack detection signal to an access point and when the control communication processing portion of the access point receives the attack detection signal, the control communication processing portion updates the current identification number stored in the identification number storage portion to a next identification number and the hash function arithmetic operation processing portion generates the fourth identification number using the current identification number after updated, hash key and third random number, and the control communication processing portion sends a random number notification signal containing the third random number to the wireless communication terminal and updates the next identification number to the fourth identification number, and next when the communicating portion of the wireless communication terminal receives the random number notification signal, the hash function arithmetic operation processing portion generates the fourth identification number using the current identification number after updated, stored in the self number storage portion, the hash key and the third random number, and updates the next identification number stored in the self number storage portion to the fourth identification number.

4. The wireless communication system according to claim 1, wherein the communicating portion of the wireless communication terminal, when receiving an initialization instruction signal or an update instruction signal from the access point, sends an acknowledge signal to the access point, and the control communication processing portion of the access point, when receiving the acknowledge signal, updates the current identification number and next identification number stored in the identification number storage portion.

5. The wireless communication system according to claim 4, wherein the access point is so constructed that the identification number storage portion is capable of storing a current identification number before updated, a current identification number after updated and a next identification number after updated, and the control communication processing portion comprises:
a detecting portion which when receiving a communication from any identification number from the wireless communication terminal before the acknowledge signal is received, detects the communication; and an identification number synchronization control portion which if the result of the detection is a current identification number before updated, sends the update instruction signal again and if the result of the detection is a next identification number after updated, updates the current identification number before updated, stored in the identification number storage portion to the next identification number after updated.

6. The wireless communication system according to claim 5, wherein the access point comprises a timer portion which starts counting of time since a signal is sent by the control communication processing portion, while the control communication processing portion includes an existence acknowledge signal sending portion and the communicating portion of the wireless communication terminal includes an existence acknowledge responding portion for sending an existence acknowledge response when the existence acknowledge signal is received, and if the acknowledge signal is incapable of being received when the timer portion detects that a predetermined time is elapsed since the update instruction signal is sent, the existence acknowledge signal sending portion sends the existence acknowledge signal to a next identification number of the wireless communication terminal, and the control communication processing portion, if the existence acknowledge response is incapable of being received although the timer portion detects that the predetermined time is elapsed, sends the update instruction signal again and if the existence acknowledge response is received, updates the current identification number stored in the identification number storage portion to a next identification number.

7. A wireless communication system constituted of a singular or plural wireless communication terminals and at least a corresponding access point, wherein the access point comprises at least
an identification number storage portion which stores an identification number inherent of the wireless communication terminal;
a key storage portion which stores a hash key shared between the wireless communication terminals;
a random number generation processing portion which generates a random number;
a hash function arithmetic operation processing portion which carries out arithmetic operation processing with a key provided hash function; and a control communication processing portion which controls communication with the wireless communication terminal, and executes a control processing for each processing portion, the hash function arithmetic operation processing portion generates a second identification number using a current identification number, a hash key and a random number for any wireless communication terminal under a control of the control communication processing portion, and the control communication processing portion sends the update instruction signal containing the random number to the wireless communication terminal at least by a predetermined cycle and updates a current identification number stored in the identification number storage portion to a second identification number, the wireless communication terminal comprises at least a communicating portion which communicates with the access point; a self number storage portion which stores an identification number inherent of self; a key storage portion which stores a hash key shared between the access points; and the hash function arithmetic operation processing portion which executes arithmetic operation processing with a key provided hash function, when the communicating portion receives the update instruction signal from the access point, the hash function arithmetic operation processing portion generates a second identification number using the current identification number stored in the self number storage portion, hash key and the random number further, updates the current identification number stored in the self number storage portion to a second identification number.

8. The wireless communication system according to claim 7, wherein the identification number of the wireless communication terminal is MAC (Media Access Control) address.

9. A communication method for wireless communication system constituted of a singular or plural wireless communication terminals and at least a corresponding access point, the access point and the wireless communication terminal previously sharing a hash key and storing in each key storage portion, the communication method comprising:
access point side identification number generating step in which the hash function arithmetic operation processing portion of an access point generates a second identification number using a current identification number, a hash key and a first random number for any wireless communication terminal under a control of the control communication processing portion of the access point and further generates a third identification number using the second identification number, the hash key and the second random number;

an initialization instruction step in which the control communication processing portion sends an initialization instruction signal containing the first and second random numbers to the wireless communication terminal;

an access point side identification number initialization step of updating a current identification number stored in the identification number storage portion to a second identification number at any time after the access point side identification number generation step and further setting a next identification number on a third identification number;

a terminal side identification number generation step in which when the communicating portion of the wireless communication terminal receives the initialization instruction signal from the access point, the hash function arithmetic operation processing portion generates a second identification number using a current identification number stored in the self number storage portion, hash key and the first random number and further generates a third identification number using the second identification number, the hash key and the second random number; and a terminal side identification number initialization step of updating a current identification number stored in the self number storage portion to a second identification number and further setting a next identification number on a third identification number.

10. The wireless communication method according to claim 9, wherein the control communication processing portion of the access point, after receiving the initialization instruction signal at least once or more, sends the update instruction signal to the wireless communication terminal by a predetermined cycle, the wireless communication method comprising:

an access point side identification number periodic generation step of generating a fourth identification number using a next identification number, hash key and third random number for any wireless communication terminal under a control of the control communication processing portion;

an update instruction step in which the control communication processing portion sends an update instruction signal containing the third random number to the wireless communication terminal;

an access point side identification number periodic update step of updating the current identification number stored in the identification number storage portion to a next identification number at any time after the access point side identification number periodic generation step and further updating the next identification number to the fourth identification number;

a terminal side identification number periodic generation step in which when the communicating portion of the wireless communication terminal receives the update instruction signal from the access point, the hash function arithmetic operation processing portion generates a fourth identification number using the next identification number stored in the self number storage portion, the hash key and the third random number; and a terminal side identification number periodic updating step of updating the current identification number stored in the self number storage portion to a next identification number and further updating the next identification number to the fourth identification number.

11. The wireless communication method according to claim 9 or 10, further comprising: a DoS attack detecting step in which the attack detection processing portion of the wireless communication terminal detects a DoS attack by measuring the amount of communication per unit time at any timing after the terminal side identification number initialization step of the wireless communication method; a terminal side identification number urgent update step in which when an attack is detected, the current identification number stored in the self number storage portion is updated to a next identification number while the communicating portion sends an attack detection signal to the access point; an access point side identification number urgent update step in which when the control communication processing portion of the access point receives the attack detection signal, the current identification number stored in the identification number storage portion is updated to a next identification number while the hash function arithmetic operation processing portion generates a fourth identification number using the current identification number after updated, the hash key and the third random number and the control communication processing portion sends a random number notification signal containing the third random number to the wireless communication terminal and updates the next identification number to the fourth identification number; and a terminal side identification number urgent update step in which when the communicating portion of the wireless communication terminal receives the random number notification signal, the hash function arithmetic operation processing portion generates the fourth identification number using the current identification number after updated, stored in the self number storage portion, the hash key and the third random number and updates the next identification number stored in the self number storage portion to the fourth identification number.

12. The wireless communication method according to claim 9, further comprising: subsequent to the initialization instruction step and the update instruction step, an acknowledge signal sending step in which the communicating portion of the wireless communication terminal sends an acknowledge signal to the access point, wherein the control communication processing portion of the access point executes the access point side identification number initialization step or the access point side identification number periodic update step after the acknowledge signal receiving step of receiving the acknowledge signal.

13. The wireless communication method according to claim 12, further comprising a detection step in which the current identification number before updated, the current identification number after updated and the next identification number after updated, of the wireless communication terminal are stored in the identification number storage portion of the access point at the same time while the detecting portion provided on the control communication processing portion detects whether or not any communication occurs from an identification number in the wireless communication terminal, wherein if the result of the detection is the current identification number before updated, the procedure is returned to the update instruction step and if the result of the detection is a next identification number after updated, steps after the access point side identification number urgent update step are executed.

14. The wireless communication method according to claim 13, further comprising an existence acknowledge step in which unless the acknowledge signal receiving step is reached even if the timer portion of the access point detects that a predetermined time is elapsed since the update instruction step, the existence acknowledge signal sending portion provided on the control communication processing portion of the access point sends the existence acknowledge signal to the next identification number of the wireless communication terminal, wherein if the existence acknowledge response to the existence acknowledge signal from the wireless communication terminal is incapable of being received within a predetermined time, the procedure is returned to the update instruction step and if the existence acknowledge response is received, the access point side identification number periodic update step is executed.

15. A communication method for wireless communication system constituted of a singular or plural wireless communication terminals and at least a corresponding access point, the access point and the wireless communication terminal sharing a hash key and storing in each key storage portion, the communication method comprising:

access point side identification number generating step in which the hash function arithmetic operation processing portion of an access point generates a second identification number using a current identification number, a hash key and a first number for any wireless communication terminal under a control of the control communication processing portion of the access point;

update instruction step in which the control communication processing portion sends the update instruction signal containing the random number to the wireless communication terminal at least by a predetermined cycle;

a terminal side identification number generation step in which when the communicating portion of the wireless communicating terminal receives the update instruction signal from the access point, the hash function arithmetic operation processing portion generates the current identification number stored in the self number storage portion, the hash key and the random number;

a terminal side identification number update step of updating the second identification number stored in the self number storage portion of the wireless communication terminal to the second identification number; and an access point side identification number updating step of updating the current identification number stored in the identification number storage portion of the access point to the second identification number at any time after the update instruction step.

16. The wireless communication method according to claim 9 or 15, wherein the identification number of the wireless communication terminal is MAC (Media Access Control) address.

* * * * *